(12) United States Patent
Maldonado et al.

(10) Patent No.: US 11,412,185 B1
(45) Date of Patent: Aug. 9, 2022

(54) MANAGEMENT OF SENSOR FAILURE IN A FACILITY

(71) Applicant: AMAZON TECHNOLOGIES, INC., Seattle, WA (US)

(72) Inventors: Emilio Ian Maldonado, Seattle, WA (US); Daniel Bibireata, Seattle, WA (US); Nishitkumar Ashokkumar Desai, Redmond, WA (US); Yasser Baseer Asmi, Redmond, WA (US); Xiaofeng Ren, Yarrow Point, WA (US); Jaechul Kim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/128,774

(22) Filed: Dec. 21, 2020

Related U.S. Application Data

(63) Continuation of application No. 14/753,235, filed on Jun. 29, 2015, now Pat. No. 10,873,726.

(51) Int. Cl.
  *H04N 7/18* (2006.01)
  *H04N 17/00* (2006.01)
(52) U.S. Cl.
  CPC ........... *H04N 7/181* (2013.01); *H04N 17/004* (2013.01)
(58) Field of Classification Search
  CPC ............................ H04N 7/181; H04N 17/004
  USPC ....................................................... 348/159
  See application file for complete search history.

(56) References Cited

U.S. PATENT DOCUMENTS

| | | | |
|---|---|---|---|
| 8,934,017 B2* | 1/2015 | Chen ...................... | H04N 7/181 348/159 |
| 2005/0018049 A1* | 1/2005 | Falk ....................... | H04N 7/181 348/207.99 |
| 2006/0074496 A1* | 4/2006 | Taware ................... | G05B 9/02 700/11 |
| 2007/0039030 A1* | 2/2007 | Romanowich ......... | H04N 5/247 725/105 |
| 2007/0139183 A1* | 6/2007 | Kates ..................... | G08B 25/14 340/521 |
| 2012/0290497 A1* | 11/2012 | Magara .................. | G06Q 10/00 705/345 |
| 2013/0212440 A1* | 8/2013 | Rom ................... | G06F 11/3072 714/47.1 |
| 2015/0036886 A1* | 2/2015 | Matono .................. | G08G 1/166 382/106 |
| 2015/0146926 A1* | 5/2015 | Ramachandran .. | G06K 9/00624 382/103 |

(Continued)

*Primary Examiner* — Tung T Vo
(74) *Attorney, Agent, or Firm* — Lindauer Law, PLLC

(57) ABSTRACT

Sensors in a facility generate sensor data associated with a region of the facility, which can be used to determine a 3D location of an object in the facility. Some sensors may sense overlapping regions of the facility. For example, a first sensor may generate data associated with a first region of the facility, while a second sensor may generate data associated with a second region of the facility that partially overlaps the first region. Sensors may fail at times as determined from sensor output data or status data. In response to identifying a failed sensor, an undetected region corresponding to the failed sensor is identified, as well as a substitute sensor that partially senses the undetected region. Sensor data from the substitute sensor, such as 2D data, is acquired and used to estimate a 3D location of an object in the undetected region.

20 Claims, 11 Drawing Sheets

(56) References Cited

U.S. PATENT DOCUMENTS

2015/0271493 A1\* 9/2015 Okazaki ............... H04N 19/179
　　　　　　　　　　　　　　　　　　　　348/211.11
2016/0323559 A1\* 11/2016 Matsunobu .......... H04N 13/243

\* cited by examiner

MANAGEMENT OF SENSOR FAILURE IN A FACILITY

PRIORITY

This application is a continuation of, and claims priority to, U.S. patent application Ser. No. 14/753,235, filed on Jun. 29, 2015, entitled "Management of Sensor Failure in A Facility", which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping area or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
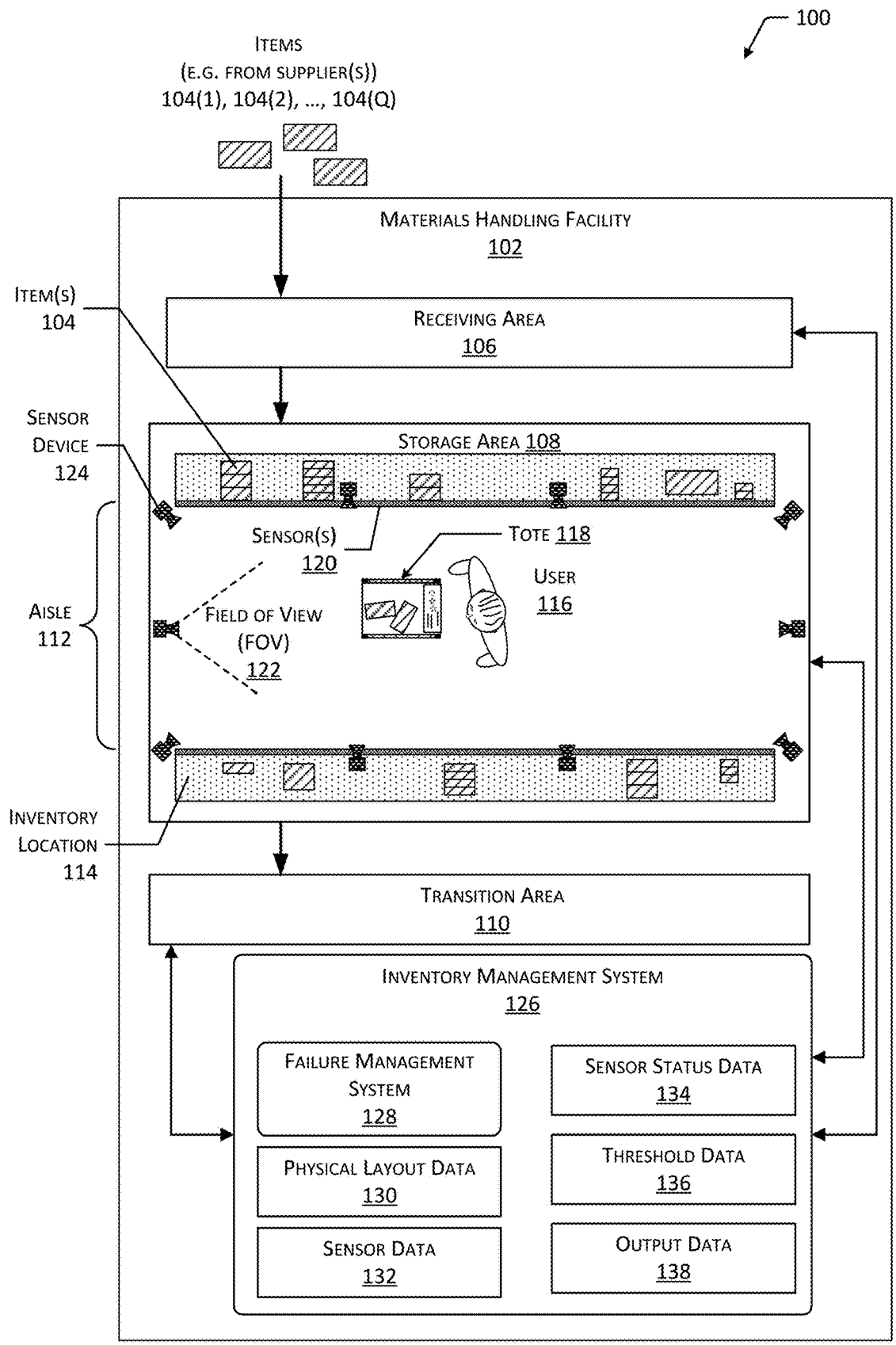
FIG. 1 is a block diagram illustrating a materials handling facility (facility) configured to use sensor devices.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for maintaining operation at a materials handling facility in the event one or more sensor devices fail. The sensor data may be acquired from sensor devices at a materials handling facility (facility) or other setting. The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. The inventory management system, or another system, may generate this data based on sensor data, such as images acquired from imaging sensors such as cameras. For example, the images may be used to identify an object such as a user or item, track the object, and so forth.

Sensor devices include one or more sensors, such as imaging sensors, depth sensors, and so forth. The sensor devices may be located at different points within the facility to acquire sensor data suitable for particular uses. The sensor data may comprise still images, video, depth data, and so forth. For example, sensor devices that include imaging sensors may be used to acquire images that are processed to identify a user. Some sensors may have a field of view (FOV) that encompasses a region at the facility, such as a volume in an aisle, a portion of a shelf, and so forth. In some implementations, the sensor devices may have different optical or electronic characteristics based at least in part on the intended usage. For example, some sensor devices may be equipped with imaging sensors including lenses to acquire close-up images, while others are equipped to acquire images from farther away.

Other sensors may have an area in which they are able to sense or detect input, such as a weight sensor under a particular portion of a floor, an instrumented auto-facing unit providing information about a quantity of items on a shelf, and so forth.

The facility may implement any number of sensor devices to support operation. For example, hundreds or thousands of sensor devices may be mounted within the facility to gather information about items as they are added or removed from inventory locations by users, provide information about the location and identity of users in the facility, and so forth.

The various sensors and computer systems described herein may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

While the probability of a malfunction of a particular sensor device is low, given the large number of sensor devices that may be deployed in the facility, the probability of failure somewhere in the facility at any given time becomes non-trivial. In the event a sensor device fails, sensor data from the region of the facility serviced by that sensor device may be lost or less reliable. For example, the sensor device may fail by ceasing to send data or may send incorrect data. If the inventory management system attempts to make determinations based on incomplete or incorrect data, those determinations may be suspect. For example, incomplete data may result in an incorrect identification of a user, place the user at an incorrect location, identify an incorrect quantity of items picked or placed, and so forth.

Described are systems and processes to mitigate the impact of sensor device failure on the operation of the inventory management system. Failures may be determined based on sensor status data, analysis of the sensor data, or both.

The sensor device may include onboard circuitry configured to generate sensor status data. The sensor status data is indicative of operation of the sensor device, as distinct from the output of the sensor itself that generates sensor data. For example, the sensor status data may indicate one or more of temperature of the sensor device's electronics, processor load, utilization of the processor, memory usage, direction or orientation of the sensor's FOV, and so forth.

A service may access the sensor status data and determine if one or more values of the sensor status data exceed a threshold value. For example, the sensor status data may indicate an average number of frames of video data provided in the past 10 seconds. A threshold value may specify that, in 10 seconds, the sensor device is to deliver 300 frames of video data (10 seconds of frames at 30 frames per second). If the sensor status data indicates that the average number of frames delivered in 10 seconds is 50 frames, that particular sensor device may be deemed to be in a fail state.

The sensor data itself may be processed to determine failure of a sensor device. For example, depth data provided by a sensor device having a depth sensor may indicate a distance of 999 meters. Given that a known maximum distance in the facility is 100 meters, the sensor device that generated the sensor data indicative of "999 meters" may be designated as in a fail state.

Once the sensor device has been determined to exhibit a failure, various techniques may be used to mitigate the impact of the failure on the operation of the facility. For example, based on the use of sensor data from a failed sensor device, a confidence value of output data generated by the inventory management system may be decreased. In another example, data from the failed sensor may be disregarded, and data from other sensors may be used instead to generate output data. For example, during normal operation, sensor devices with depth sensors may be used to generate three-dimensional point cloud data. The three-dimensional point cloud data comprises information about the distance (relative to the sensor) to objects in the FOV of the sensor. This three-dimensional point cloud data may be used to identify objects such as users, items for sale, totes, inventory locations, and so forth. Upon failure, some of this three-dimensional point cloud data may be absent or incorrect. Other sensor devices, such as imaging sensors that provide two-dimensional images, may be used by the inventory management system to mitigate the failure. Continuing the example, image data from the imaging sensors may be processed using object recognition software to identify an object, determine an approximate location within the region, and so forth. This additional processing of the image data may be more computationally intensive than that used to process the three-dimensional point cloud. For example, the three-dimensional point cloud data may be a lower resolution data set (requiring fewer computational resources) compared to a high-resolution image from a high definition camera (requiring more computational resources). In another example, the image data from several imaging sensors at several different locations in the facility having a FOV that covers at least a part of the region affected by the failed sensor device may be processed using stereo-vision techniques to determine the location of the object in the facility. To reduce the overall computer capacity and associated costs, the use of these more computationally intensive techniques may be limited to these failure mitigation situations.

By using these and other techniques described herein, the inventory management system may determine operational status of the sensor devices and may adjust to continue providing services to the users of the facility as sensor devices fail or are restored to normal function. As a result, the overall operation of the facility and the user experience may be improved.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slat-walls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses, may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, imaging sensors, weight sensors, proximity sensors, radio frequency (RF) receivers, microphones, temperature sensors, humidity sensors, vibration sensors, and so forth. The sensors 120 may be stationary or mobile, relative to the facility 102. For example, the inventory locations 114, the totes 118, or other devices such as user devices may contain sensors 120 to acquire sensor data. The sensors 120 are discussed in more detail below with regard to FIG. 2. Some sensors may have a field of view (FOV) 122 that encompasses a region at the facility 102, such as a volume in an aisle 112, a portion of an inventory location 114, and so forth.

One or more of the sensors 120 may be supported by, coupled to, or incorporated within, a sensor device 124. The sensor device 124 may comprise a computing device, one or more sensors 120, and so forth. One or more sensors 120 associated with the sensor device 124, electronics or other components associated with the sensor device 124 itself, and so forth, may fail.

In some implementations, the sensor device 124 may process "raw" sensor data obtained from the sensor 120 and provide as output the sensor data 132. In some implementations, the sensor data 132 may have a smaller file size than the "raw" sensor data. For example, the raw image data from an imaging sensor 120(1) may comprise approximately 40 megabits (Mb), while the sensor data 132 produced by the sensor device 124 may be processed, compressed, and so forth, to approximately 1.2 Mb. The sensor device 124 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 126. The inventory management system 126 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 126 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108 and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 126.

In another example, if the items 104 are departing the facility 102, a list of the items 104 may be obtained and used by the inventory management system 126 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 126 may include a failure management system 128. The failure management system 128 may be configured to determine which sensor devices 124, or sensors 120 therein, have failed, are operational, or both. Failure of the sensor device 124 may result in an undetected region. The undetected region may comprise an area or volume at the facility 102 at which phenomena that would otherwise be detected by an operational sensor device 124 may go undetected. For example, the undetected region may comprise a portion of the facility 102 for which an inoperable imaging sensor 120(1) is unable to obtain an image.

In some implementations, failure may be defined as operation or performance of the sensor device 124, or components thereof such as the sensor 120, that is beyond the threshold value. For example, failure may comprise the delivery of images acquired by imaging sensors at less than the desired frame rate. In another example, failure may comprise the sensor device 124, or sensor 120 coupled thereto, being completely inoperable. For example, a sensor device 124 that has experienced complete loss of power would be deemed to be in a failed state. Failures may be the result of malfunctioning software, malicious attack, physical component failure, human error, outside agency, and so forth. For example, a sensor device 124 may fail due to a tote 118 bumping or brushing against the sensor device 124 and changing the orientation so that the FOV 122 is pointing in a direction other than that intended for operation of the inventory management system 126.

The failure management system 128 may also initiate one or more actions to mitigate failures. For example, the failure management system 128 may determine a region of the facility 102 that is impacted by the failure and may decrease the confidence value associated with that region.

During operation, the failure management system 128 may access one or more of physical layout data 130, sensor data 132, sensor status data 134, or threshold data 136. The physical layout data 130 comprises information about the physical configuration of the facility 102 or portions thereof. For example, the physical layout data 130 may include electronic representations of the physical structures in the facility 102, such as computer aided design (CAD) data of the aisle 112 configurations, inventory locations 114, information about which items 104 are in what inventory locations 114, real coordinates of the sensor devices 124, orientation of the FOV 122 of the sensor devices 124, and so forth. The physical layout data 130 may include information about the presence of walls; heating, ventilation, and air conditioning (HVAC) equipment; location of doors and windows; and so forth.

In some implementations, the physical layout data 130 may indicate a location or position of a sensor device 124 with respect to one or more of another sensor device 124 or the facility 102. For example, the physical layout data 130 may indicate that the sensor device 124(1) is adjacent to the sensor device 124(3). Sensor devices 124 may be deemed to be adjacent when they are within a threshold distance of one another, have FOVs 122 that share at least a portion of the same scene, and so forth.

The sensor data 132 may comprise information acquired from, or based on, the one or more sensors 120. For example, the sensor data 132 may comprise 3D information about an object in the facility 102 as acquired by the depth sensors 120(2) or weight data as acquired by the weight sensors 120(6). In some implementations, sensor data 132 may include metadata such as information about imaging sensor settings used to acquire image data, filename, and so forth. The metadata associated with the sensor data 132 may be particularly associated with the acquisition of that sensor data 132. For example, the metadata may include a timestamp comprising time information indicative of the acquisition of the sensor data 132. The timestamp may be generated using time data from an internal clock of the sensor device 124. For example, the timestamp may comprise date and time information as obtained from the clock of the sensor device 124.

In comparison, sensor status data 134 is indicative of operation of the sensor device 124, or the components thereof, as distinct from the output of the sensor 120 itself that generates sensor data 132. The sensor device 124 may include onboard circuitry, software, and so forth, to generate the sensor status data 134. For example, the sensor status data 134 may indicate one or more of temperature of one or more components such as the electronics of the sensor device 124, relative humidity within the sensor device 124, processor load, memory usage, direction or orientation of the FOV 122, available electrical power, status of a network connection used by the sensor, and so forth. For example, the status of the network connection may indicate maximum throughput, number of dropped packets, packet retry count, connection speed, and so forth. The sensor status data 134 may include an explicit indicator of a failure as determined by the sensor device 124. For example, the sensor status data 134 may include a fault code or trouble report generated by the sensor device 124.

In some implementations, the sensor status data 134 may be generated based on information received by the inventory management system 126, or by another system. For example, the sensor status data 134 may be generated at least in part by monitoring traffic on the network associated with the sensor device 124. For example, the sensor status data 134 may comprise a time series indicating a count of packets transmitted by the sensor device 124 to the network within a particular period of time. In another example, the sensor status data 134 may be based on receiving a heartbeat packet or other indicator transmitted by the sensor device 124 via the network. In yet another example, the sensor status data 134 may be indicative of data transfer of data on the network involving the sensor device 124. Continuing the example, data indicative of the sensor device 124 communicating with a router may be used to generate the sensor status data 134.

The failure management system 128 may access threshold data 136 to determine the operational status of a sensor device 124. Operational status may comprise information indicative of whether the sensor device 124, or portion thereof, is deemed to be in a failed state, operational state, or other intermediate state. For example, the operational status for a particular sensor device 124 may be total failure, partial failure, operational, operational but degraded, and so forth. The threshold data 136 specifies one or more thresholds associated with operation of the facility 102. The threshold data 136 may specify thresholds in terms of one or more of boundaries, minima, maxima, percentages, functions, conditions, and so forth. For example, the threshold data 136 may specify a timeout interval after which failure to receive a heartbeat signal from the sensor device 124 would result in that sensor device 124 being designated as a failure. In some implementations the threshold data 136 may specify a binary value, such as "true" or "false". The threshold data 136 may specify fixed thresholds, or thresholds that dynamically adjust.

The failure management system 128 may determine operational status of the sensor device 124 based at least in part on the sensor data 132. The sensor data 132 may be analyzed to determine if the sensor data 132 met, exceeded, or otherwise satisfied one or more threshold values specified by the threshold data 136. For example, where the sensor data 132 comprises image data, a histogram of colors appearing within the image data may be compared with one or more values specified in threshold data 136. If the image data obtained by the sensor device 124 exhibits a color histogram indicating more red values than specified by the threshold data 136, the sensor device 124 may be deemed to have a failed operational status.

The failure management system 128 may determine operational status of the sensor device 124 based at least in part on the sensor status data 134. The sensor status data 134 may be compared to one or more thresholds specified in threshold data 136. For example, the threshold data 136 may specify that the sensor device 124(1) is to deliver sensor data 132 comprising image data at a rate of no less than 30 frames per second (FPS). The sensor status data 134 generated by the sensor device 124(1) may indicate that for the last 30 seconds, the sensor device 124(1) has delivered image data at a rate of 13 FPS. The failure management system 128 may determine that the delivered rate is less than that specified by the threshold data 136. Based on this determination, the failure management system 128 may designate the sensor device 124(1) as having an operational status of failed. In another example, the threshold data 136 may specify a maximum period that may elapse without receipt of a heartbeat packet before the sensor device 124 associated with the heartbeat packet is declared to have an operational status of failed.

In some implementations, the failure management system 128 may determine operational status of the sensor device 124 based at least in part on the sensor data 132 and the sensor status data 134. For example, the analysis of the sensor data 132 may indicate that the sensor data 132 has been relatively unchanging over a period of time while the sensor status data 134 may indicate that the processor on board the sensor device 124 is operating at 99% capacity. This combination may be deemed to be indicative of a failure such as a "stuck" sensor device 124 in which the sensor data 132 is deemed to be unreliable.

The inventory management system 126 is configured to generate output data 138 based at least in part on the sensor data 132. The output data 138 may comprise information about occurrences or activities within the facility 102, status of objects within the facility 102, and so forth. For example, the inventory management system 126 may generate output data 138 indicative of a location of an object such as the user 116, the tote 118, an item 104, and so forth, based at least in part on the sensor data 132. In another example, the output data 138 may comprise information indicative of a quantity of items 104 picked or placed from the inventory locations 114, quantity of items 104 present at the inventory locations 114 at a particular point in time, and so forth.

Based on the operational status determined by the failure management system 128, one or more mitigating actions may be taken. For example, the inventory management system 126 may be configured to utilize sensor data 132 obtained from other sensor devices 124 that are deemed to be operational or at least partially operational. Conversely, the inventory management system 126 may be configured to disregard or reduce the confidence value associated with output data 138 generated from sensor data 132 provided by the sensors 120 or sensor devices 124 having particular operational statuses, such as failed.

In the event of a failure, the failure management system 128 may mitigate the impact of the failure by accessing sensor data 132 acquired from other sensors 120. In some implementations, these other sensors 120 may have different capabilities. For example, the inventory management system 126 may be configured to generate data indicative of the location of an object such as the user 116 within the facility 102 based on information from sensor devices 124 employing three-dimensional (3D) depth sensors 120(2). The depth sensor 120(2) may provide three-dimensional point cloud data that provides information such as a relative distance between the depth sensor 120(2) and a point or area on a detected object. The point cloud data may have relatively low resolution, such as 640×480 pixels with distance indicated as an 8 bit value. Using this information, the three-dimensional point cloud data provides information as to the size and shape of the object. The inventory management system 126 may use the point cloud data from one or more sensor devices 124 to determine a location of an object at the facility 102.

In comparison, an imaging sensor 120(1) may acquire color (red-green-blue or "RGB") image data with a resolution of 1920×1080 and a color depth of 12 bits. The inventory management system 126 may process the image data from one or more imaging sensors 120(1) to determine the location of an object at the facility 102. However, compared to the processing of the sensor data 132 from the depth sensor 120(2), this processing may be more computationally intensive such as requiring the use of various image processing techniques including classifiers, neural networks, and so forth, to recognize the object, transform a position in two-dimensional space as represented by the object in the image data into a three-dimensional location, and so forth. As a result, the determination of the output data 138 such as location information may be more efficiently done using fewer resources from the point cloud data compared to the image data.

The failure management system 128 may use the sensor data 132 from other sensor devices 124 or other sensors 120 therein to generate the output data 138. For example, when the depth sensor 120(2) is determined to have an operational status of "failed", the inventory management system 126 may process the sensor data 132 from other sensors 120, such as imaging sensors 120(1), that sense data from the same region as the failed sensor 120. As a result, even with the failure of the depth sensor 120(2) in that region, the inventory management system 126 is still able to provide the output data 138 indicative of the location of the object at the facility 102.

By using the failure management system 128, the inventory management system 126 may acquire and utilize the sensor data 132 to generate output data 138 and maintain normal operation of the facility 102 even while some sensor devices 124 exhibit failures. As a result, the facility 102 may more reliably provide a variety of services to the user 116 as well as the operator, improving the overall user experience.

Figure 2:
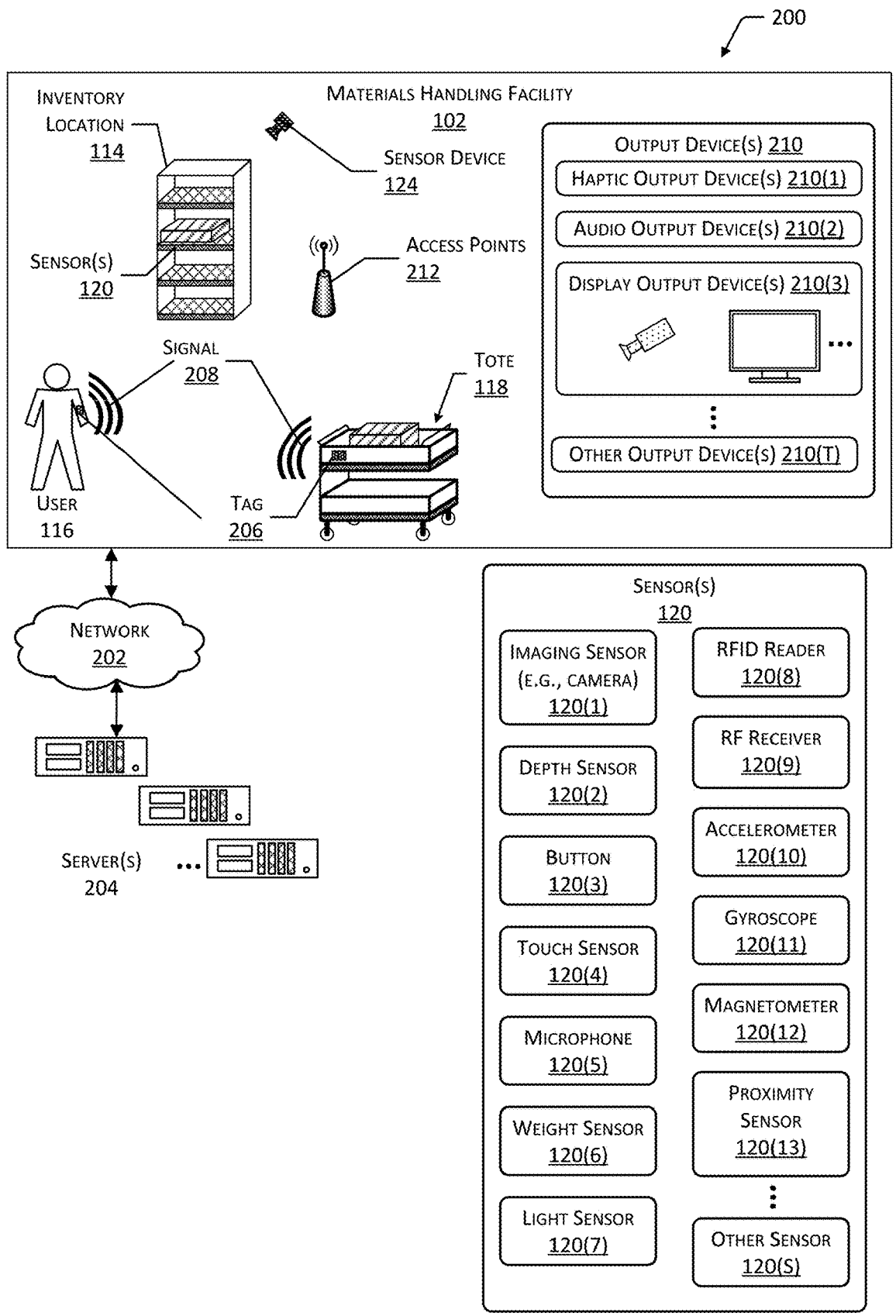
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn may connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 126. While the servers 204 are illustrated as being in a location outside of the facility 102, in other implementations, at least a portion of the servers 204 may be located at the facility 102. The servers 204 are discussed in more detail below with regard to FIG. 3.

The facility 102 may include one or more sensor devices 124. The sensor devices 124 may communicate to the servers 204 using the network 202.

The users 116, the totes 118, or other objects in the facility 102 may be equipped with one or more tags 206. The tags 206 are configured to emit a signal 208. In one implementation, the tag 206 may be a radio frequency identification (RFID) tag 206 configured to emit an RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 126 may be configured to use the tags 206 for one or more of identification of the object, determining a location of the object, and so forth. For example, the users 116 may wear tags 206, the totes 118 may have tags 206 affixed, and so forth, that may be read and used to determine identity and location.

Generally, the inventory management system 126 or other systems associated with the facility 102 may include any number and combination of input components, output components, and servers 204.

The one or more sensors 120 or the one or more sensor devices 124 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 126 may use image data acquired by the imaging sensors 120(1) during operation of the facility 102. For example, the inventory management system 126 may identify items 104, users 116, totes 118, and so forth, based at least in part on their appearance within the image data.

One or more depth sensors 120(2) may also be included in the sensors 120. The depth sensors 120(2) are configured to acquire spatial or three-dimensional data, such as depth information, about objects within a sensor FOV 122. The depth sensors 120(2) may include range cameras, lidar systems, sonar systems, radar systems, structured light systems, stereo vision systems, optical interferometry systems, coded aperture systems, and so forth. For example, the depth sensor 120(2) may include a light source, a sensor, and circuitry to generate light pulses using the light source. For example, the light source may comprise one or more light emitting diodes (LEDs) and the sensor may comprise a charge coupled device (CCD), complementary metal oxide semiconductor (CMOS), photodetector, and so forth. The depth sensor 120(2) may use the processor to execute instructions to initiate emission of a light pulse from the light source and detect a return of the pulse with the sensor. Based on a time for the light pulse to be emitted and return to the sensor and given a known velocity of light, the processor may determine a distance to at least a portion of an object in the region.

The inventory management system 126 may use the three-dimensional data acquired to identify objects, determine one or more of a location, orientation, or position of an object, and so forth. For example, the output data 138 may be based on the point cloud data provided by the depth sensor 120(2) and may include one or more of a location, orientation, position, or pose of the user 116 in three-dimensional space within the facility 102. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 126 may use data from the buttons 120(3) to receive information from the user 116. For example, the buttons 120(3) may be used to accept input from a user 116 such as a username and password associated with an account.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 126 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire audio data indicative of sound present in the environment. In some implementations, arrays of microphones 120(5) may be used. These arrays may implement beamforming or other techniques to provide for directionality of gain. The inventory management system 126 may use the one or more microphones 120(5) to accept voice input from the users 116, and so forth.

One or more weight sensors 120(6) may be configured to measure the weight of a load, such as the item 104, the tote 118, and so forth. The weight sensors 120(6) may be configured to measure the weight of the load at one or more of the inventory locations 114, the tote 118, or elsewhere. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 126 may use the data acquired by the weight sensors 120(6) to identify an object, determine a location of an object, maintain shipping records, and so forth. For example, the weight sensors 120(6) at a particular location in the facility 102 may report a weight of the tote 118, indicating the tote 118 is present at that location.

The sensors 120 may include one or more light sensors 120(7). The light sensors 120(7) may be configured to provide information associated with ambient lighting conditions such as a level of illumination. Information acquired by the light sensors 120(7) may be used by the inventory management system 126 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 126 to identify an object associated with the RF tag 206 such as the item 104, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 126 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116 may act as a compass and provide information indicative of which way the user 116 is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 132 indicative of one or more of a presence or absence of an object, a distance to the object, or characteristics of the object. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such clothing, tote 118, and so forth. In some implementations, a proximity sensor 120(13) may be installed at the inventory location 114.

The sensors 120 may include other sensors 120(S) as well. For example, the other sensors 120(S) may include instrumented auto-facing units, thermometers, barometric sensors, hygrometers, and so forth. Instrumented auto-facing units may be configured to maintain items 104 in an orderly fashion and provide information indicative of addition or removal of items 104 from the instrumented auto-facing unit. For example, the instrumented auto-facing unit may include a position sensor that moves responsive to a pick or place of an item 104 therefrom.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 126, the sensors 120, the sensor devices 124, the tag 206, a communication device of the tote 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, an LED is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays (LCDs), transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display output device 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

Figure 3:
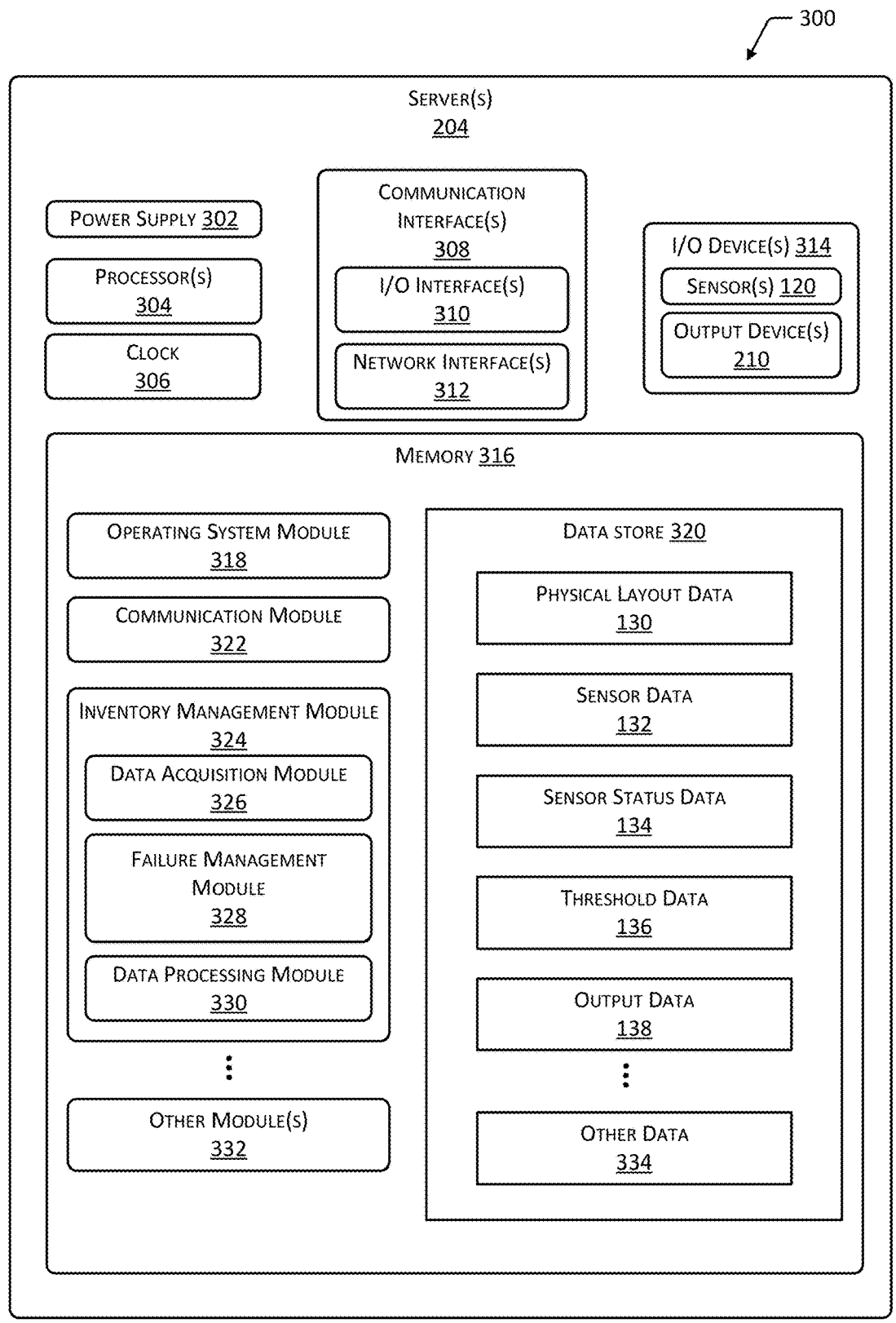
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The server 204 may include one or more hardware processors 304 (processors) configured to execute one or more stored instructions. The processors 304 may comprise one or more cores. The cores may be of one or more types. For example, the processors 304 may include application processor units, graphic processing units, and so forth. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 210 such as one or more of a display output device 210(3), printer, audio speakers, and so forth. In some embodiments, the I/O devices 314 may be physically incorporated with the server 204 or may be externally placed.

The network interfaces 312 are configured to provide communications between the server 204 and other devices, such as the totes 118, routers, access points 212, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, the sensors 120, the display output devices 212(3), other servers 204, or other devices. The communications may be authenticated, encrypted, and so forth.

The memory 316 may store an inventory management module 324. The inventory management module 324 may be configured to provide the inventory functions as described herein with regard to the inventory management system 126. For example, the inventory management module 324 may track items 104 between different inventory locations 114, to and from the totes 118, and so forth. Tracking of an object may include the determination of successive locations within the facility and information indicative of a persistence of an object, such as continuity that the same object has moved from one location to another.

The inventory management module 324 may include one or more of a data acquisition module 326, a failure management module 328, or a data processing module 330. The data acquisition module 326 may be configured to acquire and access information associated with operation of the facility 102. For example, the data acquisition module 326 may acquire information from the sensors 120, the sensor devices 124, and so forth.

The inventory management module 324 may be configured to track objects in the facility 102 or provide other services using the physical layout data 130, the sensor data 132, the sensor status data 134, and so forth, which may be stored in the data store 320.

The physical layout data 130 comprises information about the physical configuration of the facility 102 or portions thereof. For example, the physical layout data 130 may include electronic representations of the physical structures in the facility 102, such as CAD data of the aisle 112 configurations, inventory locations 114, information about which items 104 are in what inventory locations 114, real coordinates of the sensor devices 124, and so forth. The physical layout data 130 may include information about the presence of walls; HVAC equipment; location of doors and windows; and so forth.

The sensor data 132 may comprise information acquired from, or based on, the one or more sensors 120. For example, the sensor data 132 may comprise 3D information about an object in the facility 102 as acquired by the depth sensors 120(2) or weight data as acquired by the weight sensors 120(6).

The failure management system 128 may be implemented at least in part by the failure management module 328. The failure management module 328 may be configured to use one or more of the physical layout data 130, the sensor data 132, the sensor status data 134, and so forth, to determine the operational status of one or more of the sensor devices 124 in the facility 102, initiate mitigating actions, and so forth. For example, the failure management module 328 may compare the values of sensor data 132 with one or more values of threshold data 136 to determine if the sensor data 132 from a particular sensor device 124 is indicative of a failure. In another example, the failure management module 328 may compare the sensor status data 134 with one or more values of the threshold data 136 to determine if a particular sensor device 124 or sensor 120 has failed. As described above, in some implementations, the failure management module 328 may analyze the sensor data 132 and the sensor status data 134 to determine operational status of the sensor device 124 or the sensors 120 therein.

The data processing module 330 is configured to process at least a portion of the sensor data 132. In some implementations, the data processing module 330 executed by the server 204 may implement different functions from those performed by the data processing module 330 executed on the sensor device 124. For example, the data processing module 330 executed by the server 204 may use functions that require computational or memory resources that exceed those available on the sensor device 124. For example, the data processing module 330 may perform object recognition using more comprehensive classifiers.

The inventory management module 324 may use the sensor data 132 to generate output data 138. The output data 138 may include information about one or more objects, movement of those objects, and so forth. For example, the output data 138 may comprise identification data about an object, such as the user identity of the user 116. The identity of the user may be determined by processing at least a portion of the sensor data 132 received from one or more sensor devices 124. In another example, the output data 138 may include tracking data indicative of location data or motion data of an object within the facility 102 based on sensor data 132 received from one or more sensor devices 124. The identification data may identify a particular user 116, a particular item 104, tote 118, or other object. For example, the identification data may comprise an account name, a real name, a temporary identifier issued to a previously unregistered user 116, and so forth.

The tracking data provides information as to the location of an object within the facility 102, movement of the object, and so forth. For example, the tracking data may comprise data indicative of the user 116 being in aisle 112(13) in front of the inventory location 114(37).

Operation of the data processing module 330 may be affected based on the operational status determined by the failure management module 328. For example, sensor data 132 obtained from or associated with sensor devices 124 that are deemed to be in a failed state may be disregarded, or the sensor data 132 may be associated with output having a lesser confidence value than output resulting from sensor data 132 obtained from sensor devices 124 that are deemed to be in an operational state. In another example, upon determination of a failure of a particular sensor device 124, the data processing module 330 may use sensor data 132 from other sensor devices 124 or sensors 120 to maintain production of output data 138. Continuing this example, upon failure of a depth sensor 120(2), image data acquired from an imaging sensor 120(1) that covers at least a portion of the same region in the facility 102 may be processed using one or more of the techniques described below to generate the output data 138.

In some implementations, the data processing module 330 may utilize one or more services involving human operators. For example, a human operator may be presented with information and provide input indicative of operational status. The operator may determine the operational status based on one or more of the sensor data 132, the sensor status data 134, and so forth. In another example, in the event of a failure, a human operator may be presented with the sensor data 132 and asked to provide input that may then be used to generate the output data 138.

The data processing module 330 may be configured to use one or more data processing functions to identify an object depicted in the sensor data 132, a position of the object in the sensor data 132, determine motion of objects in an image, and so forth. The objects may include, but are not limited to, the items 104, users 116, totes 118, and so forth.

The data processing functions described in this disclosure may be performed at least in part using one or more of the following tools or techniques. In one implementation, the object recognition or other image processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the images. In another implementation, the EyeFace SDK as promulgated by Eyedea Recognition Ltd. of Prague, Czech Republic, may be used to process the image data. The OpenBR library and tools as originated by MITRE Corporation of Bedford, Mass., USA, and McLean, Virginia, USA, and promulgated by the OpenBR group at openbiometrics.org may also be used in some implementations for image processing.

Clothing recognition analyzes images to determine what articles of clothing, ornamentation, and so forth, the user 116 is wearing or carrying in the facility 102. Skin and hair detection algorithms may be used to classify portions of the image that are associated with the user's 116 skin or hair. Items that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

Gait recognition techniques analyze one or more of images, three-dimensional data, or other data, to assess how a user 116 moves over time. Gait comprises a recognizable pattern of movement of the user's 116 body that is affected by height, age, and other factors. Gait recognition may analyze the relative position and motion of limbs of the user 116. Limbs may include one or more arms, legs, and in some implementations, the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity of the object may be based on a combination of these or other recognition techniques. For example, the user 116 may be identified based on clothing recognition, gait recognition, object recognition, and so forth. The different recognition techniques may be used in different situations or in succession. For example, clothing recognition and gait recognition may be used at greater distances between the user 116 and the imaging sensors 120(1) or when sensor data is inadequate for accurate object recognition. Once identified, such as by way of object recognition, one or more of gait recognition or clothing recognition may be used to track the user 116 within the facility 102.

Other techniques such as artificial neural networks (ANN), active appearance models (AAM), active shape models (ASM), cascade classifiers, support vector machines, active shape models (ASM), Haar detectors, local binary pattern (LBP) classifiers, and so forth, may also be used to process images. For example, the ANN may be a trained using a supervised learning algorithm such that object identifiers are associated with images of particular objects within training images provided to the ANN. In another example, the ANN may be trained to recognize that a particular shape is associated with the user 116. Once trained, the ANN may be provided with the images and may provide, as output, the object identifier.

Other modules 332 may also be present in the memory 316, as well as other data 334 in the data store 320. For example, the other modules 332 may include an accounting module. The accounting module may be configured to add or remove charges to an account based on movement of the items 104 determined from the sensor data 132. The other data 334 may comprise information such as costs of the items 104 for use by the accounting module.

Figure 4:
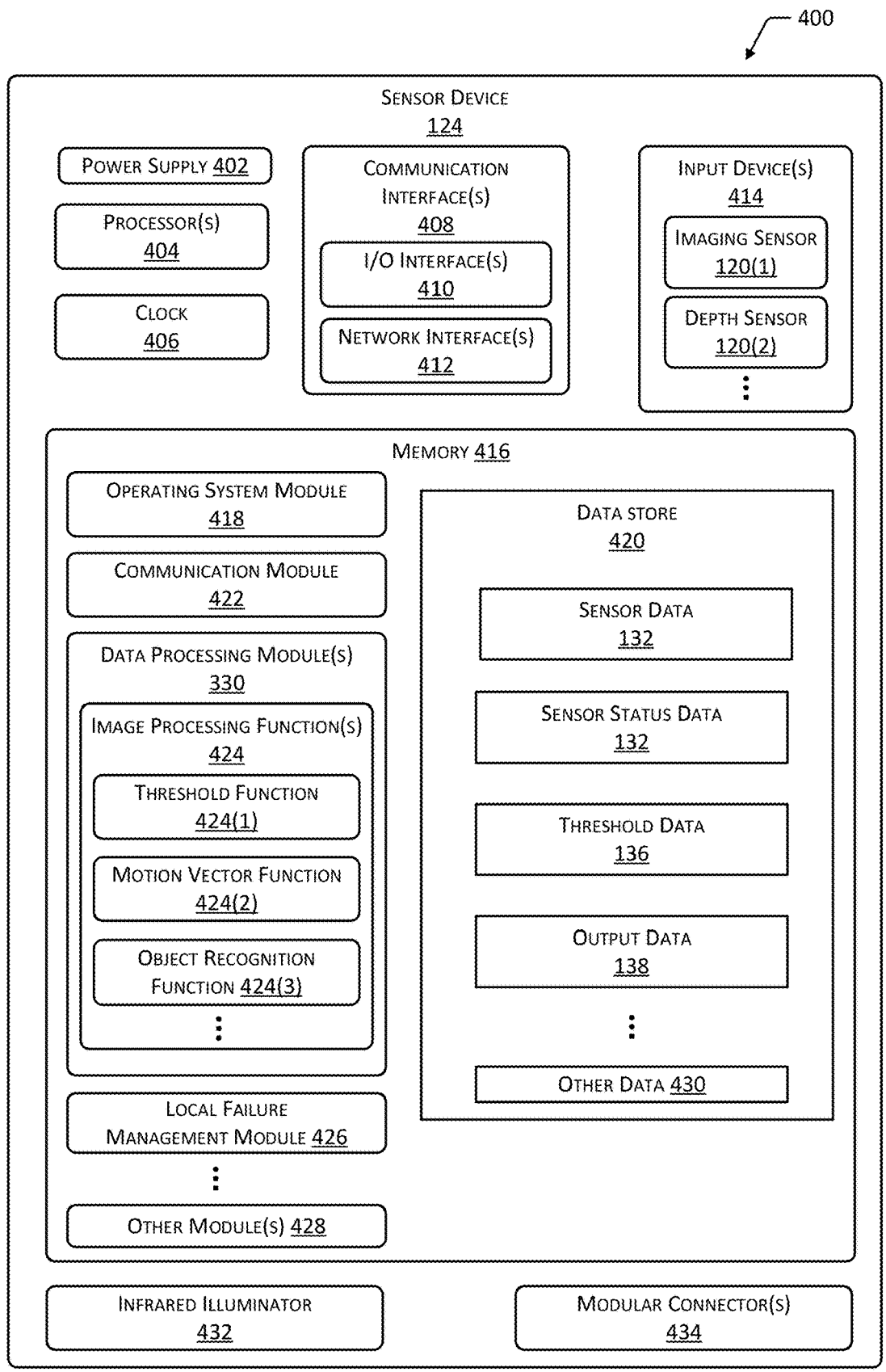
FIG. 4 illustrates a block diagram of a sensor device, according to some implementations.

FIG. 4 illustrates a block diagram 400 of a sensor device 124, according to some implementations. In some implementations, the following components described below may include diagnostic software, circuitry, and so forth, to provide information indicative of operation.

One or more power supplies 402 are configured to provide electrical power suitable for operating the components in the sensor device 124. The power supply 402 may provide power conditioning such as direct current (DC) to DC conversion, alternating current (AC) to DC conversion, voltage adjustment, frequency adjustment, and so forth. In one implementation, the power supply 402 may be configured to acquire electrical energy from a communication interface, such as a wired Ethernet connection providing power over one or more of the wires. In another implementation, the power supply 402 may comprise a wireless power receiver configured to receive transmitted electrical energy. For example, the power supply 402 may include an inductive loop or capacitive plate configured to receive electrical energy from another inductive loop or capacitive plate external to the sensor device 124.

The sensor device 124 may include one or more hardware processors 404 (processors) configured to execute one or more stored instructions. The processors 404 may comprise one or more cores of different types, functions, and so forth. For example, the processors 404 may include application processor units, graphic processing units, and so forth. In one implementation, the processor 404 may comprise the Tegra K1 processor from Nvidia Corporation of Santa Clara, Calif. In another implementation, the processor 404 may comprise an Etron eSP870 processor from Etron Technology America, Inc. of Santa Clara, Calif., configured to process image data from two imaging sensors 120(1) and generate depth data.

One or more clocks 406 may provide information indicative of date, time, ticks, and so forth. For example, the processor 404 may use data from the clock 406 to generate timestamps, trigger a preprogrammed action, and so forth.

The sensor device 124 may include one or more communication interfaces 408, such as I/O interfaces 410, network interfaces 412, and so forth. The communication interfaces 408 enable the sensor device 124, or components thereof, to communicate with other devices or components. The communication interfaces 408 may include one or more I/O interfaces 410. The I/O interfaces 410 may comprise I2C, SPI, USB, RS-232, and so forth.

The I/O interface(s) 410 may couple to one or more input devices 414. In some implementations, the sensor device 124 may be a "headless" device, in that it may not have any output devices 210 onboard for use by a human. The input devices 414 may include sensors 120, such as the imaging sensor 120(1), depth sensor 120(2), and so forth. A single sensor device 124 may include, support, or otherwise be associated with one or more sensors 120. For example, the sensor device 124 may include a depth sensor 120(2) comprising a pair of stereoscopic infrared imaging sensors 120(1) to provide stereoscopic infrared imaging and a visible light (red-green-blue or "RGB") imaging sensor 120(1). For example, the stereoscopic infrared imaging sensors 120(1) may comprise an Aptina AR0134 from Aptina Imaging Corporation of San Jose, Calif. In one implementation, the pair of imaging sensors in the depth sensor 120(2) may be arranged along a 200 mm baseline relative to one another to provide for a disparity of FOV 122 suitable for stereoscopic vision.

The input devices 414 may be at least partially physically incorporated within the sensor device 124. In one implementation, the depth sensor 120(2) may be incorporated within an enclosure of the sensor device 124. The enclosure may comprise a case, which may have an opening for light to enter to reach the sensors 120, such as the imaging sensor(s) 120(1). In another implementation, at least a portion of the sensor 120 may be configured to pan, tilt, or rotate, relative to the enclosure. In yet another implementation, the sensor device 124 may comprise a main enclosure attached to one or more secondary enclosures containing one or more of the input devices 414. For example, the imaging sensors 120(1) may be located within a separate enclosure and coupled by way of a cable to the main enclosure of the sensor device 124.

The network interfaces 412 are configured to provide communications between the sensor device 124 and other devices, routers, servers 204, access points 212, and so forth. The network interfaces 412 may include devices configured to couple to PANs, LANs, WANs, and so forth. For example, the network interfaces 412 may include devices compatible with Ethernet, Wi-Fi, Bluetooth, ZigBee, and so forth.

The sensor device 124 may also include one or more busses or other internal communications hardware or software that allow for the transfer of data between the various modules and components of the sensor device 124.

As shown in FIG. 4, the sensor device 124 includes one or more memories 416. The memory 416 comprises one or more non-transitory CRSM, as described above. The memory 416 provides storage of computer-readable instructions, data structures, program modules, and other data for the operation of the sensor device 124. A few example functional modules are shown stored in the memory 416, although the same functionality may alternatively be implemented in hardware, firmware, or as a SoC.

The memory 416 may include at least one OS module 418. The OS module 418 is configured to manage hardware resource devices such as the communication interfaces 408, the input devices 414, and so forth, and provide various services to applications or modules executing on the processors 404. The OS module 418 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 416 may be a data store 420 and one or more of the following modules. These modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other sensor devices 124, network attached storage devices, and so forth.

A communication module 422 may be configured to establish communications with one or more of the other sensor devices 124, servers 204, or other devices. The communications may be authenticated, encrypted, and so forth.

The memory 416 may store a data processing module 330, such as described above. The data processing module 330 may provide one or more data functions. For example, the data processing module 330 may implement one or more image processing functions 424, such as a threshold function 424(1), a motion vector function 424(2), an object recognition function 424(3), and so forth.

The threshold function 424(1) is configured to apply a thresholding operation to sensor data 132, such as image data obtained from an imaging sensor 120(1), point cloud data from a depth sensor 120(2), and so forth. For example, the threshold function 424(1) may be configured to generate a binary image from image data. Continuing the example, implementations utilizing the OpenCV library may execute the function "threshold" to generate sensor data 132 comprising a binary image. In one implementation, the binary image comprises a digital image in which each pixel is expressed as a single bit value, such as a "1" or a "0". For example, the binary image may comprise a version of the image data that been reduced to a 1-bit depth for each pixel.

The motion vector function 424(2) may be configured to provide a motion vector associated with a portion of the image data. For example, the user 116 walking through the FOV 122 may manifest as a group of pixels changing from one frame of image data to another. The motion vector function 424(2) may generate sensor data 132 comprising information indicative of an optical flow between a plurality of images. Continuing the example, implementations utilizing the OpenCV library, the functions "calcOpticalFlow-PyrLKd" or "DenseOpticalFlow" may be used to generate sensor data 132 comprising motion data.

The object recognition function 424(3) may be configured to provide information that identifies an object. In one implementation, the object recognition function 424(3) may be configured to identify a human face within image data. Continuing the example, implementations utilizing the OpenCV library, the function "FaceRecognizer" may be used to generate sensor data 132 comprising a subset of the image data that includes the image of the face.

The data processing module 330 may include other functions 424(F) (not shown) as well. For example, a depth data generation module may be configured to generate depth data from image data acquired by two or more imaging sensors 120(1) separated by a distance, from the depth sensor 120(2), and so forth. Continuing the example, output from the two or more imaging sensors 120(1) may be used to generate sparse stereo depth data, dense stereo depth data, and so forth. Other modules may provide registration data for alignment between depth data and image data, construction of three-dimensional point clouds, point cloud projection, application of one or more filter functions, and so forth.

The other functions 424(F) may also include data compression. For example, the sensor data 132 may comprise image data for which the background has been removed, and the image of the remaining foreground object(s) has been processed with one or more filter functions.

A local failure management module 426 may also be stored in the memory 416. The local failure management module 426 may be configured to determine the operational status of the components onboard or otherwise coupled to or associated with the sensor device 124. For example, the local failure management module 426 may gather data from various hardware sensors and software systems to generate the sensor status data 134. The local failure management module 426 may access threshold data 136 stored in the data store 420, from one or more of the servers 204, or a combination thereof.

The local failure management module 426 may pass the sensor status data 134 to the data processing module 330 onboard the sensor device 124, the data processing module 330 at the server 204, or both. Operation of the data processing module 330 may then change based at least in part on one or more of the analysis of the sensor data 132, analysis of the sensor status data 134, and so forth.

Other modules 428 may also be present in the memory 416, as well as other data 430 in the data store 420. For example, the other modules 428 may include a power management module. The power management module may be configured to transition the sensor device 124 from a low power mode to a higher power operating mode. For example, the data processing module 330 may determine that no motion has occurred within subsequent image data for a threshold amount of time. Responsive to this determination, the power management module may place the sensor device 124 into a lower power mode, to reduce power consumption, heat generation, and so forth. The other data 430 may comprise information such as timing thresholds for use by the power management module.

The sensor device 124 may also include an infrared illuminator 432 to illuminate at least a portion of the FOV 122. For example, the infrared illuminator 432 may comprise a vertical-cavity surface-emitting laser (VCSEL). The infrared illuminator 432 may project a pattern from a mask onto at least a portion of the FOV 122 using the VCSEL and a projection lens. In some implementations, the infrared illumination may be at a center wavelength of about 850 nanometers (nm) to 870 nm.

The sensor device 124 may include one or more modular connectors 434. The modular connectors 434 may provide one or more of mechanical, electrical, optical, or other types of connectivity. In one implementation, the modular connectors 434 may comprise an Ethernet connection such as an RJ-45 jack. In another implementation, the modular connector 434 may comprise a mechanical coupling such as a slot, tab, or other mechanical engagement feature suitable for affixing the sensor device 124 to another structure, such as an inventory location 114, wall, light fixture, and so forth.

Figure 5:
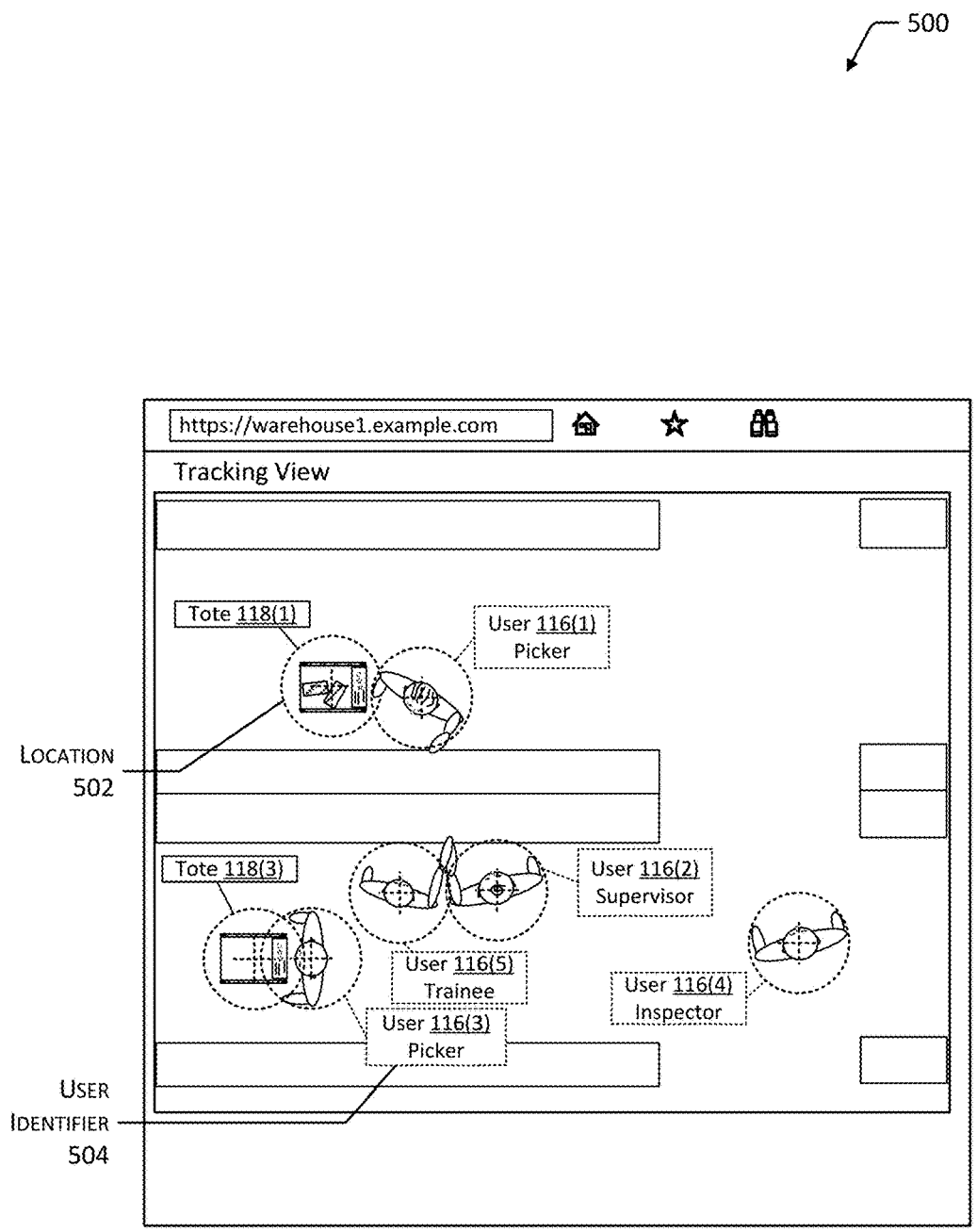
FIG. 5 illustrates a user interface presenting information based on sensor data acquired from the sensor devices, according to some implementations.

FIG. 5 illustrates a user interface 500 for presenting information based on sensor data 132 acquired from one or more of the sensors 120, according to some implementations. As described above, the inventory management module 324 may process the sensor data 132 and generate output data 138. The output data 138 may include information such as location and identification of one or more objects within the facility 102. The output data 138 may be presented to a human operator using the user interface 500 depicted here to facilitate administration of the facility 102 such as a fulfillment center. As described above, the output data 138 may provide information indicative of a location 502 of an object within the facility 102. In this illustration, visual indicia are provided in the form of dotted circles surrounding the object. The output data 138 may also include identification information, such as a user identifier 504. In this illustration, the user identifier 504 is presented as a dotted box attached by a dotted line to the visual indicia of location 502 that includes information such as the role of the user 116. For example, user 116(2) is a "Supervisor" while user 116(5) is a "Trainee".

By utilizing the sensor data 132 from a plurality of sensor devices 124 within the facility 102, the inventory management system 126 may be capable of providing one or more services. The services may be accessible to the user 116, an administrator, or a third party. For example, the user 116 in the facility 102 who is picking an order for a customer may ask for directions to find a particular item 104 within the facility 102. Based on the location 502 determined by the inventory management system 126, and given previously stored data indicative of where items 104 are stowed, the user 116 may be directed to the item 104 sought.

Figure 6:
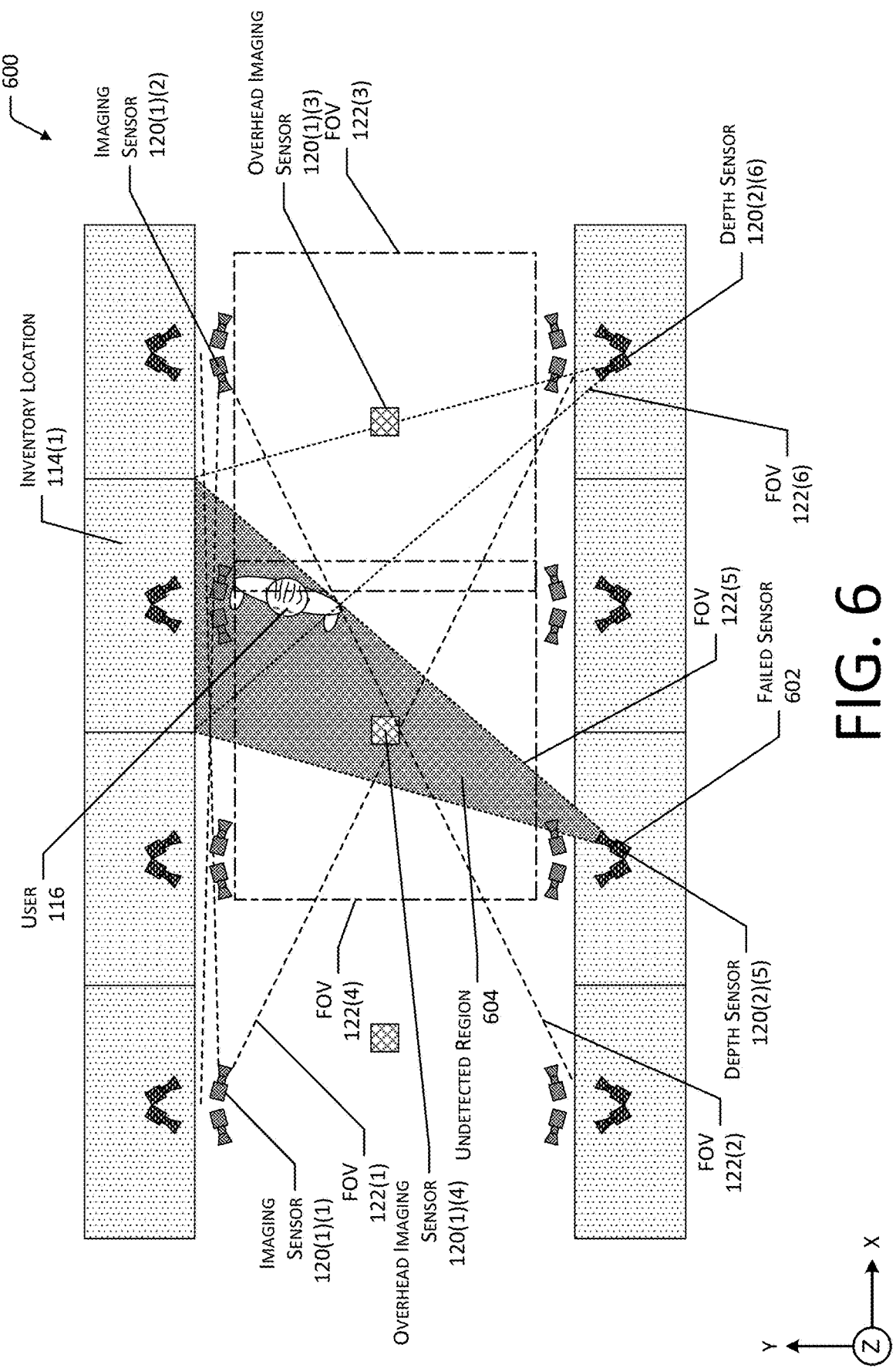
FIG. 6 illustrates an overhead view of the facility during failure of a sensor device and use of other sensor devices to maintain operation of the facility, according to some implementations.

FIG. 6 illustrates an overhead view 600 of the facility 102 during failure of a sensor device 124 and use of other sensor devices 124 to maintain operation of the facility 102, according to some implementations.

In this illustration, a plurality of inventory locations 114 is depicted on either side of an aisle 112. The user 116 is standing in front of the inventory location 114(1). Phenomena proximate to the inventory location 114(1) may be detected by one of a plurality of sensors 120 and their corresponding sensor devices 124. For the purposes of this illustration, the sensors 120 are depicted, while the sensor devices 124 that support them are omitted for clarity.

Depicted are the FOVs 122 for some of the sensors 120 that cover the region at least partially occupied by the user 116. The imaging sensor 120(1)(1) has a FOV 122(1) which includes the same region as occupied by the user 116, while the imaging sensor 120(1)(2) has a FOV 122(2) that also includes the same region as occupied by the user 116. Overhead imaging sensors 120(1)(3) and 120(1)(4) have FOVs 122(3) and 122(4), respectively, that also include the same region as occupied by the user 116. The depth sensor 120(2)(5) has a FOV 122(5) and the depth sensor 120(2)(6) has a FOV 122(6) that each include the same region as occupied by the user 116. The region that includes the user 116 is also within the FOV 122 of other sensors 120, which are not depicted here.

In this illustration, the depth sensor 120(2)(5) has failed and is designated as a failed sensor 602 producing an undetected region 604 corresponding to the FOV 122(5). However, sensor data 132 continues to be gathered from that region by other sensors 120. In some implementations, the sensors 120 may be divided into different groups to provide for some measure of redundancy. For example, a first group may include the depth sensor 120(2)(5) while a second group may include the depth sensor 120(2)(6). In some implementations the groups may include different types of sensors 120. The first group may be powered by a first bus while the second group may be powered by second bus, each bus supplied by an independent power supply. Similarly, sensor devices 124 in the first group may be attached to a first network 202(1) while sensor devices 124 in the second group may be attached to a second network 202(2). In this way, failure of the infrastructure supporting the first group still leaves the second group operational. The sensors 120 associated with the different groups may have some degree of overlap. For example, as shown in this disclosure, the FOV 122(2) overlaps at least partially the FOV 122(5).

The undetected region 604 may be determined based on the physical layout data 130 or other information. For example, given a known direction of the FOV 122(5), data about the shape of the FOV 122(5), and the location of the depth sensor 120(2)(5) within the facility 102, the undetected region 604 may be determined.

The failure management module 328 may send information indicative of the failed sensor 602, the undetected region 604, and so forth, to the data processing module 330. The data processing module 330 may mitigate the failure by removing from consideration the sensor data 132 associated with the failed sensor 602, designating the sensor data 132 received from a failed sensor 602 as being less reliable, changing a confidence value associated with the output data 138, and so forth. For example, given the failed sensor 602, information such as the location or identity of the user 116 within the region may be determined to have a lower confidence value than when all of the sensors 120 covering that region are operational.

As described above, the failure management module 328 may be configured to utilize sensor data 132 from other sensors 120 to maintain services such as object tracking, object identification, and so forth. For example, the failure management module 328 may determine the undetected region 604 and may initiate mitigation actions that utilize the overhead imaging sensors 120(1)(3) and 120(1)(4) to determine the location of the user 116 in conjunction with point cloud data from the depth sensor 120(2)(6).

Figure 7:
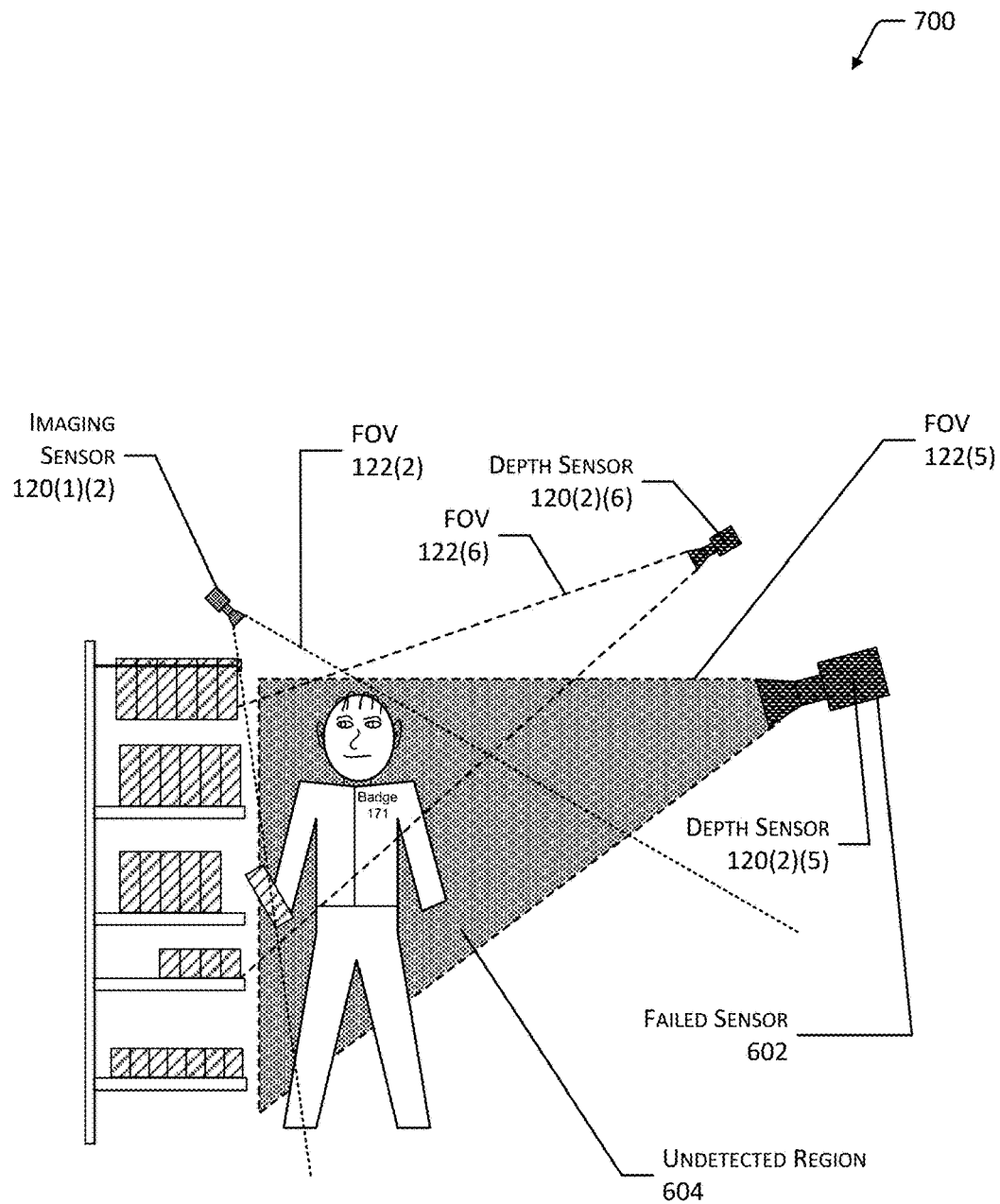
FIG. 7 illustrates a side view of the facility during the failure of the sensor device and use of other sensor devices to maintain operation of the facility, according to some implementations.

FIG. 7 illustrates a side view 700 of the facility 102 during the failure of the sensor device 124 as described in FIG. 6. As illustrated, the failure management module 328 may mitigate the effect of the failed sensor 602 on the operation of the inventory management module 324. From the side view 700, the FOV 122(6) of the depth sensor 120(2)(6) encompasses a region that includes approximately an upper half of the body of the user 116. In comparison, the FOV 122(5) of the depth sensor 120(2)(5), which has been determined to be the failed sensor 602, has an undetected region 604 that encompasses a region of the user 116 from about the knees up. The employee badge or identification number of "171" on a jacket of the user 116 is within the FOV 122(2) of the imaging sensor 120(1)(2). As a result of the failed sensor 602, the failure management module 328 may provide operational status data to the data processing module 330 indicative of the failure. The data processing module 330 may then process the available sensor data 132 using different techniques. For example, rather than looking for an overall shape of the entire user 116, the data processing module 330 may switch to classifiers or more computationally intensive algorithms that are able to determine the shape of the arms, torso, head, or other portion of the user 116 and maintain tracking with only a partial view of the user 116.

Illustrative Processes

Figure 8:
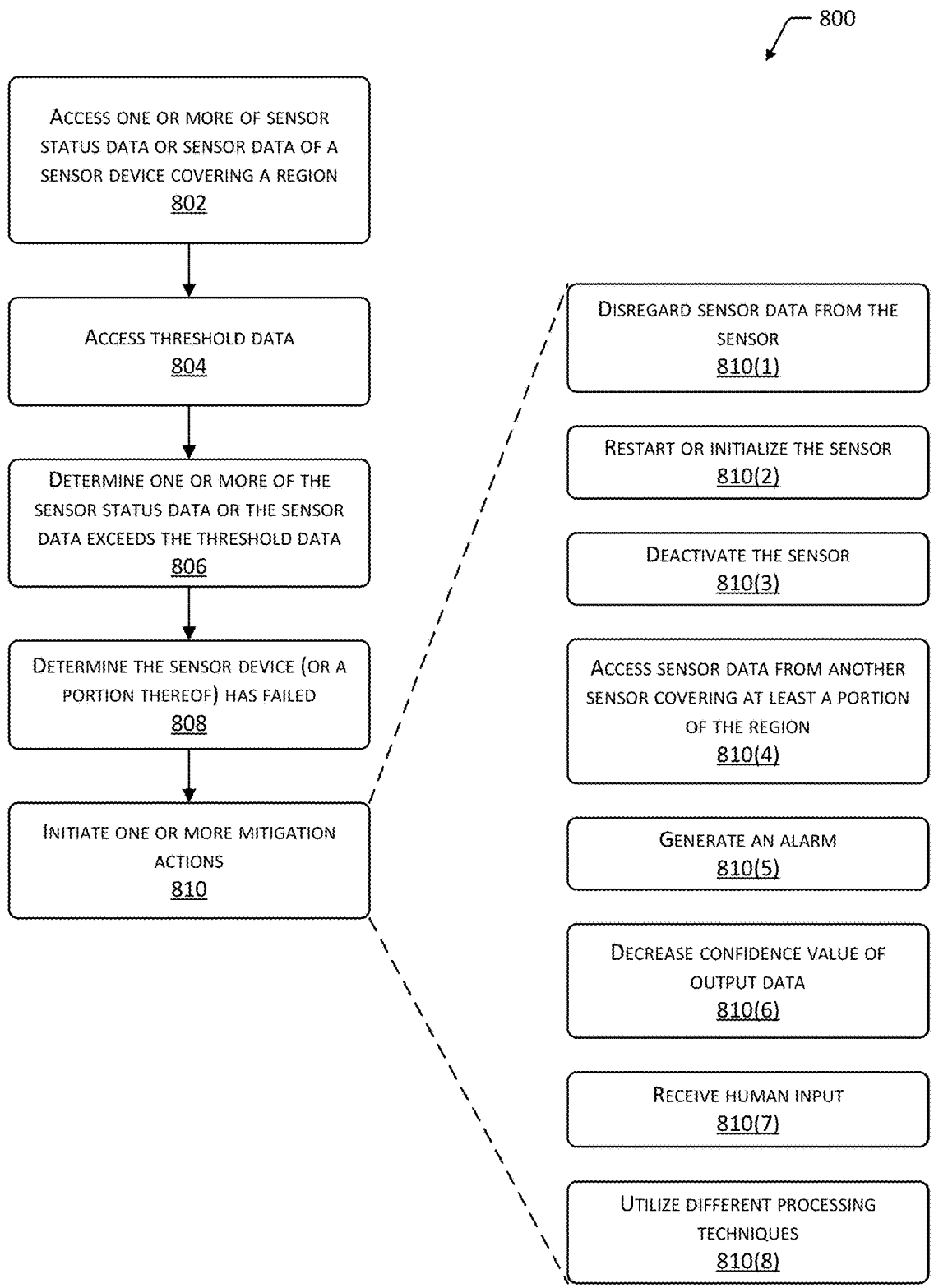
FIG. 8 depicts a flow diagram of a process of determining failure of a sensor device, according to some implementations.

FIG. 8 depicts a flow diagram 800 of a process of determining failure of a sensor device 124 based on sensor status data 134, according to some implementations. In some implementations, the process may be performed at least in part by the server 204.

Block 802 accesses sensor status data 134 indicative of one or more operational parameters of at least a portion of a sensor device 124 having one or more sensors 120 covering a region at the facility 102. For example, the sensor status data 134 may be indicative of a number of frame delivery failures by the sensor 120 over a period of time. In another implementation, instead of or in addition to the sensor status data 134, the sensor data 132 may be accessed.

Block 804 accesses threshold data 136. For example, the threshold data 136 may specify a maximum number of frame delivery failures that are permitted for a sensor 120 to be deemed operational.

Block 806 determines one or more of the sensor status data 134 or the sensor data 132 exceeds the threshold data 136. For example, the number of missed frames indicated by the sensor status data 134 may exceed the value specified in the threshold data 136.

As described above, in other implementations, instead of or in addition to the analysis of the sensor status data 134, the sensor data 132 may be analyzed to determine the operational state of the sensor device 124 or one or more sensors 120 associated with the sensor device 124.

Block 808 determines the sensor device 124 or one or more of the sensors 120 associated with the sensor device 124 has failed. For example, based at least in part on the determination that a value of the sensor status data 134 exceeds a value specified by the threshold data 136, the operational status of the sensor device 124 may be determined.

Block 810 initiates one or more mitigation actions. One or more of the following mitigation actions may be taken independently of one another, in series, in parallel, and so forth.

Block 810(1) may disregard sensor data 132 generated by the sensor device 124 or the sensor 120 that has been determined to have failed. For example, the disregarded sensor data 132 may be omitted from consideration by the data processing module 330.

Block 810(2) may restart, initialize, cycle the power, or initiate a reset of the sensor device 124 or the sensor 120 that has been determined to have failed. For example, the sensor device 124 may be instructed to shut down and restart.

Block 810(3) deactivates the sensor device 124 or the sensor 120. For example, the sensor device 124 may be instructed to power down the sensor 120 that is determined to have failed.

Block 810(4) may access sensor data 132 from another sensor 120 that covers at least a portion of the region affected by the failure. Returning to the example of FIG. 6, the sensor data 132 may be obtained from the overhead imaging sensors 120(1)(3) and 120(1)(4).

Block 810(5) may generate an alarm. For example, the alarm may comprise a dispatch sent to one or more maintenance personnel or robots to repair or replace the failed sensor 602.

Block 810(6) may decrease the confidence value of output data 138. In one implementation, the confidence value of output data 138 that is based at least in part on sensor data 132 obtained from a sensor 120 or sensor device 124 that is deemed to have failed may be decreased. For example, the sensor data 132 from a sensor device 124 that is deemed to be partially failed may be deemed to be less reliable and therefore be associated with a lower confidence value. In another implementation, the confidence value of output data 138 that is associated with the region within which one or more sensors 120 or sensor devices 124 have failed may be decreased. For example, sensor data 132 from the failed sensor 602 may be disregarded and the output data 138 may be determined based on sensor data 132 from other operational sensors 120 sensing at least a portion of the region.

The confidence value of this output data 138 may be decreased given that less sensor data 132 was available to generate the output data 138.

Block 810(7) may utilize human input to mitigate the failure of the sensor 120 or the sensor device 124. In one implementation, data indicative of the failure and at least a portion of sensor data 132 may be provided to a manual processing system. The manual processing system may include the user interface 500 as described above. The user interface may receive input such as the results of analysis that have been obtained from the manual processing system. Output data 138 based on the input may then be generated. Returning to the example of FIG. 6, image data obtained from the overhead imaging sensors 120(1)(3) and 120(1)(4) may be provided via the user interface 500 to a human operator. The human operator may then associate a particular user identifier 504 with a particular person depicted in the image data. This association may then be used to generate the output data 138.

Block 810(8) utilizes different processing techniques, or modifies existing processing techniques, to process the at least a portion of the available sensor data 132. For example, the failed sensor 602 may be experiencing a delay in the delivery of sensor data 132, such as providing image data at 15 frames per second instead of 30 frames per second. The data processing module 330 may "slow down" by dropping some of the frames of image data that are acquired by other sensors 120 that sense the same region. As part of this "slow down" to match the delay in delivery, the refresh rate of location data of the user 116 may be decreased to 15 times per second rather than 30 times per second.

The inventory management module 324 may utilize one or more of the techniques to synchronize sensor data 132. Different sensors may deliver frames at different rates. For example, an imaging sensor 120(1) may deliver 30 frames of image data per second, a failed sensor 602(1) may deliver 2 frames of image data per second, and another failed sensor 602(2) may deliver 7 frames of image data per second. Furthermore, the delivery of the frames to a processing device such as a server may be irregular. For example, traffic congestion on a local area network may introduce latency in the delivery of packets carrying the frames, the sensor 120 may be delayed in sending the frames due to other computational tasks, and so forth.

Several frames may be deemed to be synchronized when timestamps (or other indicia of time) associated with the frames occur within a particular time window or interval of time. For example, the interval of time may be about 70 milliseconds (ms) in width. Frames that occur within the same 70 ms window may thus be deemed to be synchronized. Thus, synchronized data may comprise a set of frames that have occurred contemporaneously or nearly-so with respect to one another.

Each of the sensors 120 may generate a feed of frames. For example, the feed may comprise one or more frames sent from a sensor 120 to another device such as a server. In one implementation, the feed may comprise a single connection that is maintained between the sensor 120 and the receiving device. In another implementation, the feed may comprise data sent over many connections between the sensor 120 and the receiving device. The many connections may be established in series, in parallel, or a combination thereof.

The frames in the feed may be sent at various times. For example, the frames in the feed may be sent at regular intervals. In another example, the frames may be sent at irregular intervals.

The frames may include header information such as a timestamp, sensor identifier, and so forth. For example, the timestamp may indicate the time, as reported by a clock internal to the sensor 120, at which the data in the frame was acquired. The frames may include payload information, such as image data, weight data, or other information. For example, the payload for a frame generated by an imaging sensor 120(1) may comprise a series of images captured over some interval of time.

The inventory management system may include a synchronization module. The synchronization module processes the feeds of frames from several sensors 120 and determines sets of frames that are within a common time window. The sets of frames that are determined to be within a common interval of time or time window may then be designated as synchronized data. The synchronized data may be used for subsequent processes of the system 100.

In one implementation, the synchronization module may generate synchronized data by using the following process. The frames from each feed may be stored in a separate buffer. For example, the facility 102 may include three cameras, each camera generating a feed of frames. The frames received from a first camera may be stored in a first buffer, frames from a second camera may be stored in a second buffer, and frames from a third camera may be stored in a third buffer. Each of the frames has a timestamp indicating a time the frame was generated by the respective sensor.

Continuing the implementation, the process may determine a first set of frames. The first set of frames includes the oldest frame from each of the buffers. Oldest, newest, and so forth, may be determined by comparing the timestamp of one frame to another, comparing the timestamp of one frame to a current time, and so forth.

Among the first set of frames, a timestamp value of a newest frame is determined. For example, the frame in the second buffer may be the newest or most recently generated of the three frames in the first set of frames.

A time window may be designated, with a newest point of the time window being set to the timestamp value of the newest frame in the first set of frames. For example, an end point of the time window may be set to the time indicated by the time value of the newest frame. The time window has a duration that extends from a start point to an end point, with the start point being at an earlier or older time than the later or newer end point. Successive time windows may occur at irregular intervals with respect to one another, and may even overlap with one another in some implementations. For example, where the time window is 70 ms in duration, a first time window may start at time=10 and end at time=80, while the second time window may start at time=17 and end at time=97.

The frames having timestamps before the start point of the time window may be discarded or otherwise disregarded from further consideration. For example, these frames may be removed from the buffer.

For each buffer, the frame within the time window having a newest timestamp is determined. For example, within the time window the third buffer may have two frames. The frame that has a later timestamp that is closer to current time may be determined. Continuing the example, the first buffer may have only one frame within the time window, and the second buffer may have only one frame within the time window. These frames may be designated as the newest within the time window for their respective buffers.

The frames for each of the buffers that occur within the time window and have the newest timestamp may be designated as synchronized data. Continuing the example, the three frames may be designated as synchronized data. The synchronized data may be sent to other systems or modules for further processing. Once sent, the frames in the synchronized data may be discarded from the buffer, and the process may continue, selecting another set of synchronized data. Frames that were not included in the synchronized data may remain in the buffer.

In some situations, frames may be absent from the buffer, frames may be distributed in time such that they do not fall within the time window, and so forth. The inventory management system 126 may specify service level guarantees, such as providing synchronized data within 1 second or less. A maximum delay value may be specified that indicates a maximum deviation from current time that frames may have to be considered.

In some implementations, frames that are older than this maximum delay value may be discarded from the buffers. In other implementations, a last known frame in the buffer may be retained and used in the synchronized data, even if that last known frame has a timestamp outside of the time window.

In other implementations, other techniques may be used to mitigate the failure. For example, the other sensors 120 having FOVs 122 that cover the region affected by the failure may be configured to increase the rate of data acquisition, such as increasing frame rate of the imaging sensor 120(1).

Figure 9:
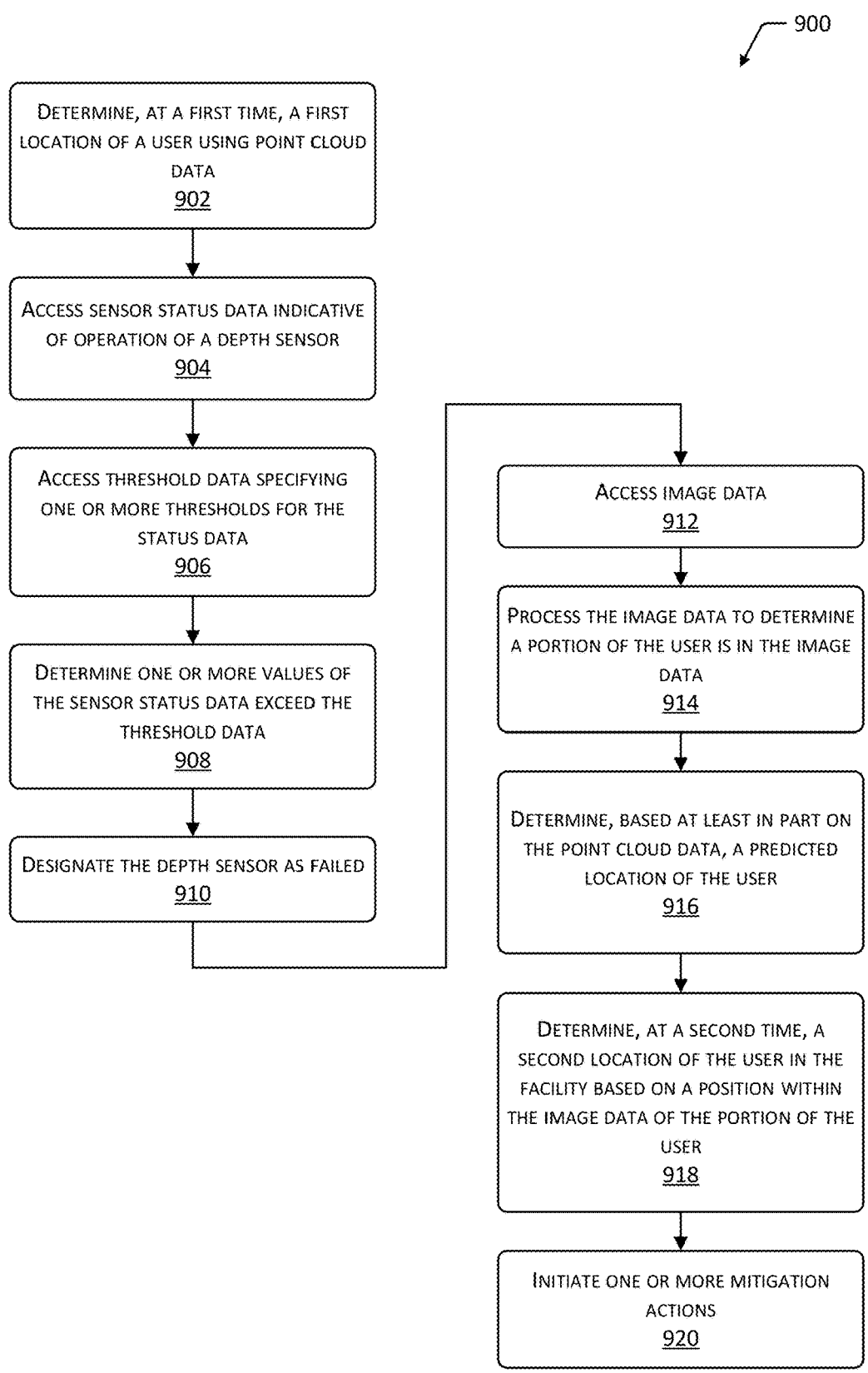
FIG. 9 depicts a flow diagram of a process of mitigating failure of sensor devices, according to some implementations.

FIG. 9 depicts a flow diagram 900 of a process of determining and coping with failure of sensor devices 124 or sensors 120, according to some implementations. In some implementations, the process may be performed at least in part by the server 204.

Block 902 determines, at a first time, a first location of the user 116 at the facility 102 using point cloud data. For example, the point cloud data may be acquired by one or more of the depth sensors 120(2). Data indicative of the first location may be used to track the user 116, or another object, within the facility 102.

Block 904 accesses sensor status data 134 indicative of operation of the depth sensor 120(2). For example, the sensor status data 134 may be indicative of a number of frame delivery failures by the depth sensor 120(2) over a period of time.

Block 906 accesses threshold data 136 specifying one or more thresholds for the sensor status data 134. Continuing the example, the one or more thresholds for the sensor status data 134 may specify a maximum number of frame delivery failures.

Block 908 determines one or more values of the sensor status data 134 exceed the values specified by the threshold data 136. Continuing the example, the sensor status data 134 may indicate 13 frame delivery failures in the past 1 second and the threshold may specify a maximum of 5 frame delivery failures per second.

Block 910 designates the depth sensor 120(2) as failed. For example, the failure management module 328 may write data to the data store 320 that is indicative of the failure.

Responsive to the determination of the failure, block 912 accesses the image data obtained from one or more imaging sensors 120(1) having a FOV 122 that includes at least a portion of a region associated with the depth sensor 120(2) that failed.

Block 914 processes the image data to determine a portion of the user 116 or other object is in the image data. For example, the data processing module 330 may utilize one or more of the processing techniques described above such as ANN, cascade classifiers, and so forth, to determine a portion of the user 116, such as a head, arm, leg, foot, and so forth. A transformation matrix may be used to associate the position in the image (such as row and column of associated pixels) of the portion to a particular location within the facility 102. For example, the pixel having coordinates of (1217, 773) may be associated with a location in aisle 112(17) in front of inventory location 114(3). Based on this association, a second location of the user 116 or other object may be determined. The second location may be the same as the first, or the object may have moved. Data indicative of the second location may be used to track the user 116 or other object at the facility 102.

In some situations the second location may be confirmed or cross-checked using another process. Block 916 may determine, based at least in part on the point cloud data a predicted location of the user 116 or other object. Based at least in part on the point cloud data, a direction of motion of the user 116 and a speed of the user may be determined. For example, a time series of point cloud data may be used to determine one or more of a direction or velocity of the user 116, such as the user 116 is heading north at 1 meter per second. An elapsed time since the point cloud data was acquired may be determined, such as 2 seconds. A distance traveled is determined by multiplying the speed of the user 116 by the elapsed time. Continuing the example, 1 m/s×2 s=2 meters traveled. Coordinates of the first location are summed with a vector comprising the distance traveled and the direction of motion. If the first location was at coordinates (1,1) then the predicted location may be at (1, 2). A threshold distance may be specified. When a distance between the predicted location and the second location are within the threshold distance, the second location may be deemed to be valid. When the distance between the predicted location and the second location are greater than the threshold distance, the system may take one or more actions such as re-processing the image data using another algorithm, acquiring new image data, generating an error message, and so forth.

Block 918 determines, at a second time, a second location of the user 116 in the facility 102 based on a position within the image data of the portion of the user 116. For example, the data processing module 330 may use a transform function to associate a particular row and column of a pixel or group of pixels in the image data with a particular location or set of locations within the facility 102. For example, a calibration target may be placed at a known location within the FOV 122 of the imaging sensor 120(1), and the correspondence between the known location and actual position within the image may be used to generate the transform function. By recognizing the failure of the sensor 120, the failure management module 328 may thus direct the data processing module 330 to determine the output data 138, such as the location of the user 116, using the image data.

In some implementations, the determination of the second location may be based at least in part on the first location and the one or more of direction of motion or speed of the object, such as determined at block 916. For example, based on the direction of motion and the speed of the user 116, the location at the second time may be estimated. This estimation may be compared with the location based on the image data. Where the estimation and location based on the image data are within a threshold value of one another, the second location may be assigned a confidence value that is relatively high.

Responsive to the data indicative of the depth sensor as having failed, block 920 initiates one or more mitigation actions to attempt to restore the sensor 120 to operation. For example, the failed depth sensor may be rebooted. One or more of the mitigation actions as described herein may be taken independently of one another, in series, in parallel, and so forth.

In some situations, the mitigation actions may restore the sensor 120 or sensor device 124 to an operational status. A block may determine the sensor 120 is operational, subsequent to the one or more mitigation actions. Another block may acquire third sensor data 132(3) from the sensor 120 that is now operational. Third output data may be generated using the third sensor data 132(3).

Figure 10:
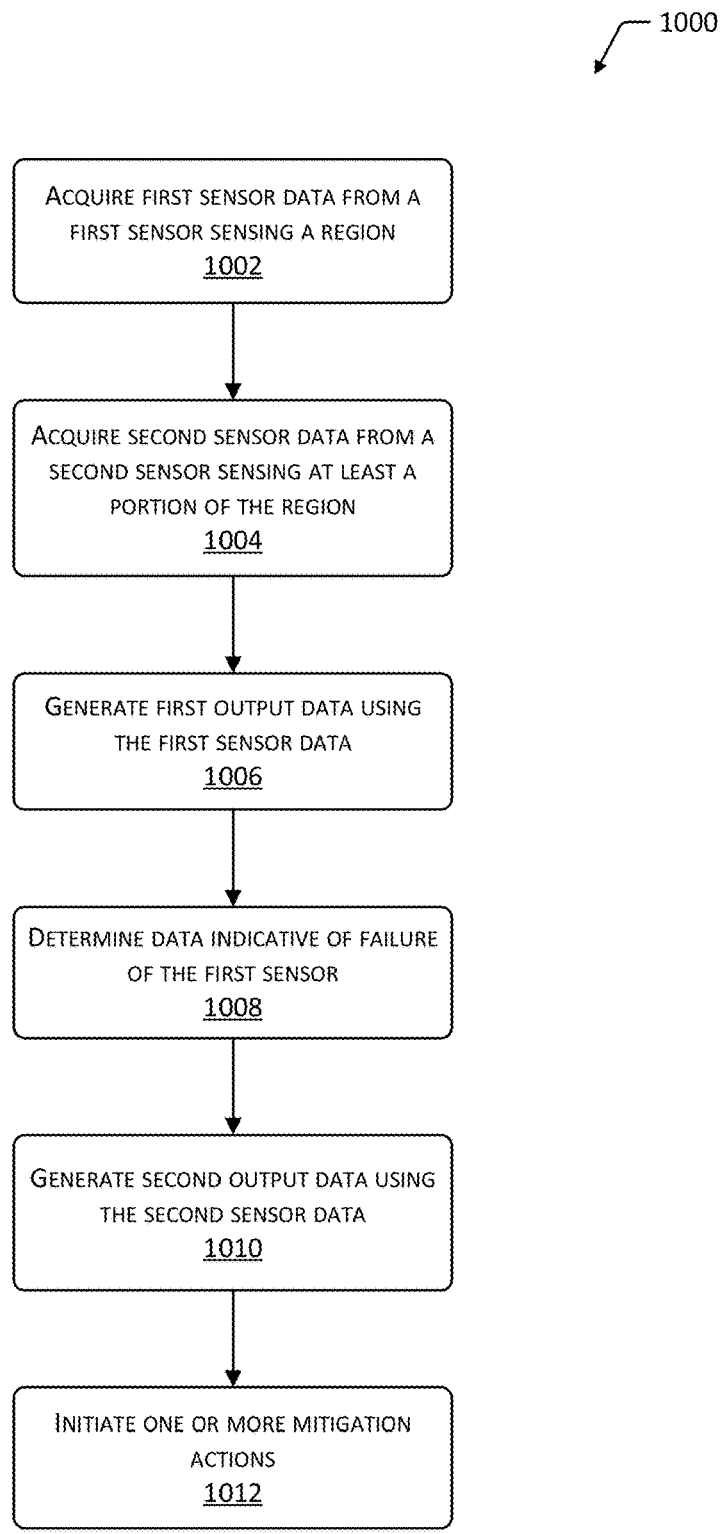
FIG. 10 depicts a flow diagram of a process of determining output data during failure of a group of sensor devices, according to some implementations.

FIG. 10 depicts a flow diagram 1000 of a process of determining output data 138 during failure of a group of sensor devices 124, according to some implementations. In some implementations, the process may be performed at least in part by the server 204.

Block 1002 acquires first sensor data 132(1) from a first sensor 120(1) sensing a region. Block 1004 acquires second sensor data 132(2) from a second sensor 120(2) sensing at least a portion of the region. The first sensor 120(1) and the second sensor 120(2) may have FOV 122 that encompass the same volume of the facility 102.

Block 1006 generates first output data 138(1) using the sensor data 132(1). The first output data 138(1) may have a first confidence value indicative of predicted accuracy of the first output data 138(1). In some implementations, the first output data 138(1) may be generated using a first processing module or a first algorithm. For example, the first algorithm may be designed to process point cloud data to track a location of an object over time. The first algorithm may be optimized to use fewer computational resources such as processor cycles, memory, and so forth, compared to the second algorithm. Continuing the example, the second algorithm may be designed to recognize an object in image data, utilize a transform to determine a location of an object at the facility 102, and so forth.

Block 1008 determines failure of a particular sensor 120 or sensor device 124 of the plurality of sensors 120 or sensor devices 124. The block may determine the failure based at least in part on the sensor status data 134. The block may access sensor status data 134 received from or associated with at least a portion of the plurality of sensors 120, sensor devices 124, and so forth. For example, the sensor status data 134 may be indicative of a rate of delivery of data from the particular sensor 120. The failure may be determined based at least in part on the rate of delivery of data being less than a threshold specified by the threshold data 136.

In another implementation, failure may be determined based at least in part on the sensor data 132, such as described above. For example, a block may determine third output data 138(3) based on sensor data 132 acquired from a third sensor 120(3).

Another block may then determine difference data that is indicative of a difference between the third output data 138(3) and the first output data 138(1) exceeds a threshold amount. For example, the difference may be calculated by subtracting values of the first output data 138(1) from the third output data 138(3). In another example, the difference may be based on analysis of the images, such as utilizing edge detection algorithms to determine edges in the respective output data, and comparing the size, shape, relative position, and so forth of those edges.

The failure may be determined based at least in part on the difference exceeding the threshold amount. With this implementation, two or more different sensors 120 or sensor devices 124 may be used to test one another. Should a discrepancy between them exceed a threshold amount, the failure may be determined.

In still another implementation, the failure may be determined based at least in part on the sensor data 132. A block may determine difference data that is indicative of a difference between one or more values of the sensor data 132 from the particular sensor 120 and one or more values of threshold data 136. The failure may be determined based at least in part on the difference exceeding the threshold amount. For example, the sensor data 132 may include data indicating a row of pixels has a measured average red channel value of 255. The threshold data 136 may specify a maximum average red channel value variance of 250. The difference may be calculated as 255−250=5. The threshold data 136 may also specify that a difference that is greater than 0 is indicative of a failure.

The sensor 120 associated with a failure may be determined using the sensor data 132 obtained by the particular sensor 120 or sensor device 124. For example, metadata tags within the sensor data 132 may be read to determine a sensor identifier that is indicative of the first sensor 120 or sensor device 124.

Block 1010, based at least in part on the data indicative of failure, generates second output data 138(2) using at least a portion of the second sensor data 132(2). The second output data 138(2) having a second confidence value indicative of predicted accuracy of the second output data 138(2). In some implementations, the second confidence value is less than the first confidence value. For example, the second confidence value may be indicative of the fact that, based on the lesser sensor data 132 available, the accuracy of the output data 138 is decreased relative to when all sensors 120 servicing that region are operable.

As described above, in some implementations, the failure may comprise a slowdown in the delivery of sensor data 132 to the server 204. In this situation, a block may determine first frames provided by the plurality of sensors 120 that have not been determined to have failed. The frames may comprise image data, point cloud data, or other sensor data 132. Another block may then determine second frames provided by the particular sensor 120 determined to have failed. Synchronized data may be generated using at least a subset of the first frames and the second frames. For example, some of the delayed frames may be used in conjunction with the timely frames to generate synchronized data that may then be used by the data processing module 330 to generate the output data 138.

The generation by block 1010 of the second output data 138(2) may utilize a second processing module or algorithm. The second algorithm may consume more computational resources than the first algorithm while in operation. For example, the second algorithm may utilize additional cascade classifiers, ANNs, pattern recognition algorithms, and so forth to process image data to recognize the object to be tracked, determine motion of the object, and so forth.

The various sensors 120 and sensor devices 124 within the facility 102 may have different capabilities, such as described above. In one implementation, the plurality of sensors 120 may include a first set of imaging sensors 120(1)(1) and a second set of imaging sensors 120(1)(2). The second set of imaging sensors 120(1)(2) may generate images with a higher resolution than the first set of imaging sensors 120(1)(1). The sensor data 132 used to generate the first output data 138(1) may be obtained from the first set of imaging sensors 120(1)(1), and the sensor data 132 used to generate the second output data 138(2) may be obtained from the second set of imaging sensors 120(1)(2).

Block 1012 initiates one or more mitigation actions. For example, one of the mitigation actions described above with regard to FIG. 8 may be initiated. In some implementations, the data processing module 330 may slow down the rate at which output data 138 is generated. For example, the inventory management module 324 may generate the first output data 138(1) at a first rate of output per unit of time. As the sensors 120 or sensor devices 124 fail, the inventory management module 324 may generate the second output data 138(2) at a second rate of output per unit of time, wherein the second rate is less than the first rate of output per unit of time. As a result, the output data 138 may be delivered less frequently, but still is being delivered in spite of the failure, allowing at least partial functionality of the inventory management module 324.

In some situations, one or more of the mitigation actions may be successful in restoring the previously failed sensor 120 or sensor device 124 to an operational state. In such a situation, a block may determine the particular sensor 120 or sensor device 124 is operational. Based at least in part on this determination, the sensor data 132 acquired by the particular sensor 120 or sensor device 124 may be used to generate third output data 138(3).

Figure 11:
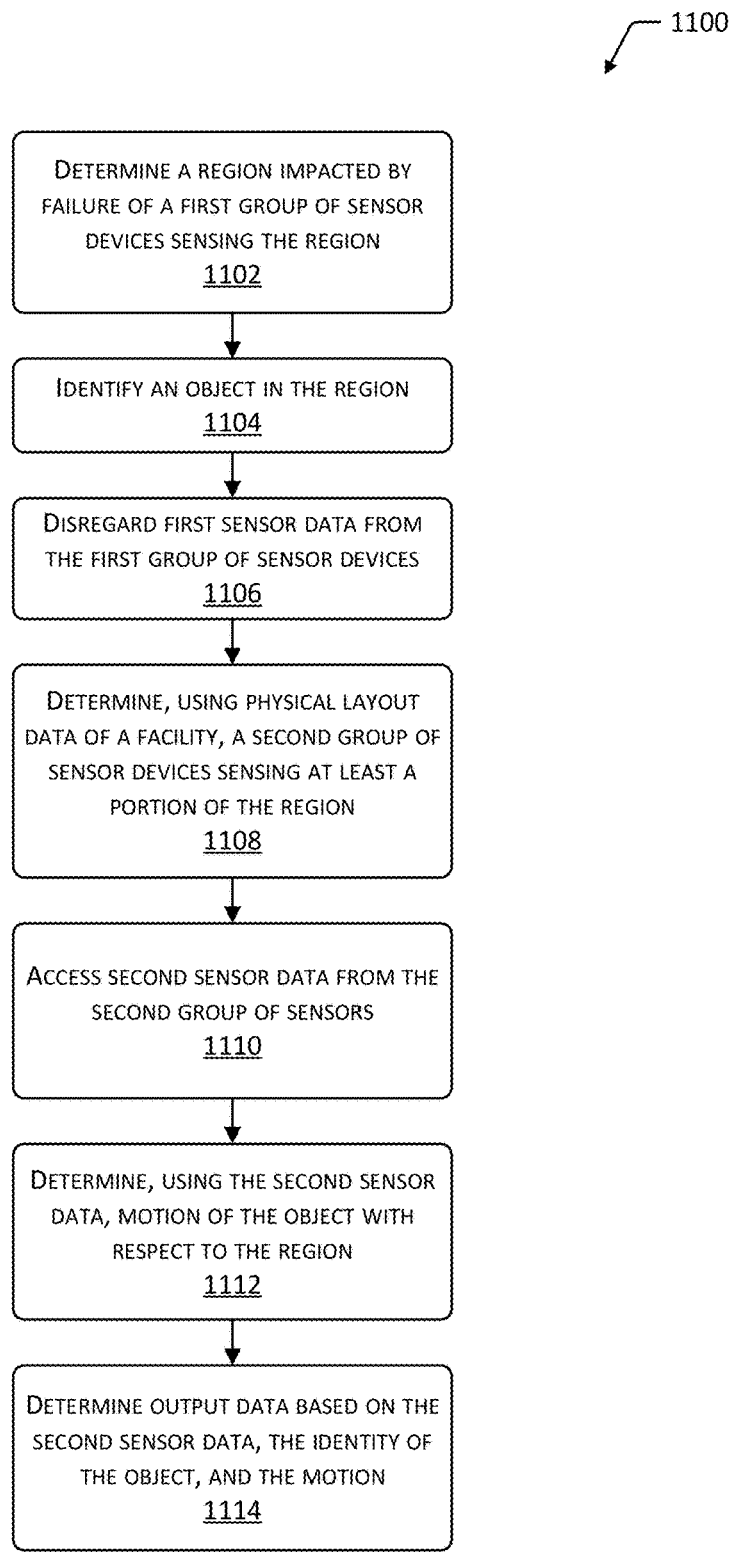
FIG. 11 depicts a flow diagram of another process of determining output data during failure of a group of sensor devices, according to some implementations.

FIG. 11 depicts a flow diagram 1100 of a process of determining output data 138 during failure of a group of sensor devices 124, according to some implementations. In some implementations, the process may be performed at least in part by the server 204.

Block 1102 determines a region of a facility 102 that is impacted by failure of a first group of sensor devices 124 that are sensing at least a portion of the region. The determination as to which sensor devices 124 have failed may be made as described above. For example, the determination of the failure may be based at least in part on a comparison between the threshold data 136 and one or more of the sensor data 132 or the sensor status data 134.

Block 1104 identifies an object in the region. The identification may be based at least in part on sensor data 132 such as point cloud data, image data, weight data, data obtained from an RFID tag, from an optical tag, and so forth. For example, the data processing module 330 may use one or more data processing techniques such as ANNs or cascade classifiers to recognize that the object is a user 116.

Block 1106 disregards first sensor data 132(1) acquired from the first group of sensor devices 124. For example, the data processing module 330 may not use the first sensor data 132(1) for the generation of output data 138.

Block 1108 determines, using physical layout data 130 of the facility 102, a second group of sensor devices 124 sensing at least a portion of the region. Returning to the example of FIG. 6, it may be determined that the depth sensor 120(2)(6) has some overlap in the region that is within the undetected region 604 produced by the failure of the depth sensor 120(2)(5).

Block 1110 accesses second sensor data 132(2) acquired from the second group of sensor devices 124. The second group of sensor devices 124 may include the same types of sensors 120 as the first group of sensor devices 124 or may include different types of sensors 120. For example, the first group of sensor devices 124 may be imaging sensors 120(1) while the second group of sensor devices 124 may be depth sensors 120(2).

Block 1112 determines, using the second sensor data 132(2), motion of the object with respect to the region. For example, optical flow techniques may be used to determine the motion of the user 116 between two points in time.

Block 1114 determines output data 138 based on the second sensor data 132(2), the identity of the object, and the motion.

For example, block 1104 may determine the object is a user 116. Block 1112 may determine the motion indicates the user 116 entered the region. Block 1114 may receive third sensor data 132(3) from an instrumented auto-facing unit in the region indicating a pick or place of one or more items 104. Block 1112 may determine the motion indicates the user 116 exited the region. Block 1114 may then determine the output data 138 based at least in part on the third sensor data 132(3). In this example, no other users 116 were detected within the region. The motion of the user 116 was into the region before the pick was detected by the instrumented auto-facing unit, and the motion of the user 116 out of the region was detected after the pick was detected. Based on this data, the output data 138 may indicate that the user 116 picked an item 104 from the inventory location 114 associated with the instrumented auto-facing unit.

In some implementations, block 1114 may access, based on the identity of the object, data indicative of one or more of physical characteristics or behavior of the object. For example, where the object is identified as user 116, the data may include a maximum speed the user 116 is expected to move, details about shape and size typically associated with the user 116, and so forth. The output data 138 may be determined based at least in part on the data indicative of one or more of physical characteristics or behavior of the object.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first sensor;
a second sensor;
a memory storing computer-executable instructions; and
a hardware processor to execute the computer-executable instructions to:
  access first sensor data received from the first sensor;
  determine first output data indicative of a first location of an object in three-dimensional (3D) space within a facility, using the first sensor data;
  access first sensor status data associated with the first sensor, the first sensor status data indicative of a number of frame delivery failures over a period of time;
  access threshold data indicative of one or more threshold values associated with the first sensor status data, the one or more threshold values indicative of a maximum number of frame delivery failures permitted for the first sensor to be operational;
  determine the number of frame delivery failures indicated in the first sensor status data exceeds the maximum number of frame delivery failures indicated in the threshold data;
  determine a failure of the first sensor; and
  responsive to the failure of the first sensor:
    access image data received from the second sensor, the second sensor having a field of view that includes at least a portion of a region associated with the first sensor;
    determine a portion of the object is in the image data; and
    generate second output data indicative of a predicted second location of the object in the 3D space within the facility based on a position within the image data of the portion of the object.

2. The system of claim 1, the hardware processor to further execute the computer-executable instructions to:
track the object at the facility using the first location of the object and the predicted second location of the object.

3. The system of claim 1, the hardware processor to further execute the computer-executable instructions to:

determine the predicted second location of the object in the 3D space within the facility further based on one or more of:
the first sensor data,
the first location of the object in the 3D space within the facility,
a direction of motion of the object, or
a speed of the object.

4. The system of claim 1, the hardware processor to further execute the computer-executable instructions to:
determine the first sensor is operational after the failure;
access second sensor data received from the first sensor, after becoming operational;
generate third output data indicative of a third location of the object in the 3D space within the facility, using the second sensor data; and
track the object at the facility using the third location of the object.

5. A system comprising:
a first sensor;
a second sensor;
a memory storing computer-executable instructions; and
a hardware processor to execute the computer-executable instructions to:
access first data received from the first sensor;
determine second data using the first data, the second data indicative of a first location of an object in three-dimensional (3D) space within a facility;
determine third data indicative of one or more values associated with operation of the first sensor, the one or more values indicative of a rate of delivery of data from the first sensor;
access threshold data indicative of one or more threshold values associated with the third data, the one or more threshold values indicative of a threshold rate of delivery of data from the first sensor;
determine the rate of delivery of data from the first sensor is less than the threshold rate of delivery of data from the first sensor;
determine a failure of the first sensor; and
responsive to the failure of the first sensor:
access image data from the second sensor, the second sensor having a field of view that includes at least a portion of a region associated with the first sensor;
determine a portion of the object is in the image data; and
generate fourth data indicative of an estimated second location of the object in the 3D space within the facility, based on a position within the image data of the portion of the object.

6. The system of claim 5, the hardware processor to further execute the computer-executable instructions to:
determine the second data using a first algorithm; and
generate the fourth data using a second algorithm.

7. The system of claim 5, the hardware processor to further execute the computer-executable instructions to:
perform one or more actions responsive to the determination of the failure of the first sensor, the one or more actions comprising one or more of:
disregarding the first data,
disregarding the second data,
decreasing a confidence value associated with the second data, or
initiating one or more mitigation actions to attempt to restore operation of the first sensor.

8. The system of claim 5, the computer-executable instructions to generate the fourth data indicative of the estimated second location of the object in the 3D space within the facility further comprising instructions to:
detect at least the portion of the object between two points in time; and
determine motion of the object between the two points in time.

9. The system of claim 5, wherein:
the determination of the failure of the first sensor is based on the rate of delivery of data from the first sensor being less than the threshold rate of delivery of data from the first sensor.

10. The system of claim 5, wherein:
the third data is further indicative of a number of frame delivery failures over a period of time; and
the threshold data is further indicative of a maximum number of frame delivery failures permitted over the period of time.

11. The system of claim 5, the hardware processor to further execute the computer-executable instructions to:
determine that a first frame from the first data and a second frame from the image data occur within a threshold time of one another; and
generate synchronized data from the first frame and the second frame.

12. The system of claim 5, wherein:
the second data is generated at a first rate;
the fourth data is generated at a second rate; and
the second rate is less than the first rate.

13. The system of claim 5, wherein the third data comprises one or more of:
a temperature of one or more components of the first sensor,
a relative humidity within the first sensor,
utilization of a second hardware processor of the first sensor,
memory usage,
a direction or orientation of a first field of view of the first sensor,
electrical power available to the first sensor,
a status of a network connection used by the first sensor,
a fault code sent by the first sensor,
data indicative of data transfer involving the first sensor on a network,
time series data indicating a count of packets transmitted by the first sensor within a particular period of time, or
data indicative of a last time receipt of a heartbeat packet sent by the first sensor.

14. The system of claim 5, wherein:
the first sensor comprises a depth sensor;
the first data comprises 3D point cloud data of a first region; and
the second sensor comprises an imaging sensor.

15. A method comprising:
accessing first data from a first sensor;
determining a first location of an object in three-dimensional (3D) space within a facility, based on the first data;
accessing first sensor status data indicative of one or more values associated with operation of the first sensor, the one or more values indicative of a number of frame delivery failures over a period of time;
accessing threshold data indicative of one or more threshold values associated with the first sensor status data, the one or more threshold values indicative of a maximum number of frame delivery failures permitted for the first sensor to be operational;
determining that the number of frame delivery failures indicated in the first sensor status data exceeds the maximum number of frame delivery failures indicated in the threshold data;
determining a failure of the first sensor;
accessing image data from a second sensor, the second sensor having a field of view that includes at least a portion of a region associated with the first sensor;
determining a portion of the object is in the image data; and
determining an approximate location of the object in the 3D space within the facility based on a position within the image data of the portion of the object.

16. The method of claim 15, further comprising:
disregarding the first data from the first sensor, in response to determining the failure of the first sensor.

17. The method of claim 15, further comprising:
determining motion of the object with respect to the region using the image data.

18. The method of claim 15, further comprising:
accessing data indicative of one or more characteristics or behaviors of the object; and
determining output data based on the image data, an identity of the object, the approximate location of the object, and the data indicative of the one or more characteristics or behaviors of the object.

19. The method of claim 15, further comprising:
accessing physical layout data associated with a plurality of sensors in the facility, the plurality of sensors comprising the first sensor and the second sensor; and
determining that the field of view associated with the second sensor includes the at least the portion of the region associated with the first sensor based on the physical layout data.

20. The method of claim 15, further comprising:
tracking the object at the facility using the first location of the object and the approximate location of the object.

* * * * *